US010929783B1

(12) United States Patent
Davis et al.

(10) Patent No.: US 10,929,783 B1
(45) Date of Patent: Feb. 23, 2021

(54) OPTIMIZED SEARCH USING REWARDS INFORMATION

(71) Applicant: Amazon Technologies, Inc., Seattle, WA (US)

(72) Inventors: Wesley Shawn Davis, Seattle, WA (US); Damien Renaud Leake, Seattle, WA (US); Anshu Kumar Mishra, Issaquah, WA (US); Gregory Forrest Wright, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 14/969,679

(22) Filed: Dec. 15, 2015

(51) Int. Cl.
*G06Q 10/02* (2012.01)
*G06Q 50/14* (2012.01)
*G06Q 30/02* (2012.01)

(52) U.S. Cl.
CPC ....... *G06Q 10/025* (2013.01); *G06Q 30/0233* (2013.01); *G06Q 50/14* (2013.01)

(58) Field of Classification Search
CPC ... G06Q 10/025; G06Q 30/0233; G06Q 50/14
See application file for complete search history.

(56) References Cited

U.S. PATENT DOCUMENTS

| 7,359,866 | B2* | 4/2008 | Farat | G06Q 30/02 705/14.27 |
| 8,434,111 | B2* | 4/2013 | Levy | H04N 7/106 725/46 |
| 8,489,452 | B1* | 7/2013 | Warner | G06Q 30/0226 705/14.34 |
| 8,527,336 | B2* | 9/2013 | Kothari | G06Q 30/02 705/14.23 |
| 8,578,418 | B2* | 11/2013 | Levy | H04N 7/106 370/503 |
| 8,626,579 | B2* | 1/2014 | Fordyce, III | G06Q 20/10 705/14.1 |

(Continued)

OTHER PUBLICATIONS

NASDAQ OMX's News Release Distribution Channel, "CheapTickets Launches CheapCash Loyalty Program That Gives Travelers Up to $75 in Rewards When Booking a Flight: New Hotel Pricing Comparison "Dares Consumers to Compare" by Showing the Hotel Prices of Other Travel Companies," (continued next line).*

(Continued)

*Primary Examiner* — Nathan Erb
(74) *Attorney, Agent, or Firm* — Lee & Hayes, P.C.

(57) ABSTRACT

Managing reward program memberships and corresponding rewards for generating personalized search engine results pages is described. A service provider may receive a search query associated with an item and access a plurality of search results associated with the search query. Each search result may correspond to a listing associated with the item. The service provider may access reward program data including data associated with rewards available from a plurality of reward programs and may determine a reward is redeemable for listing corresponding to a search result of the plurality of search results. The service provider may generate a personalized search result based at least partly a determination that a reward is redeemable for the listing and may generate a personalized search engine results page to be presented via a device.

20 Claims, 6 Drawing Sheets

(56) References Cited

U.S. PATENT DOCUMENTS

| | | | | |
|---|---|---|---|---|
| 8,713,612 | B2* | 4/2014 | Levy | H04N 7/106 |
| | | | | 725/46 |
| 8,812,532 | B2* | 8/2014 | Skaf | G06Q 30/02 |
| | | | | 707/768 |
| 9,038,112 | B2* | 5/2015 | Warrick | H04N 7/106 |
| | | | | 725/78 |
| 9,152,973 | B2* | 10/2015 | Warner | G06Q 30/0226 |
| 9,301,001 | B2* | 3/2016 | Warrick | H04N 7/106 |
| 9,596,509 | B2* | 3/2017 | Warrick | H04N 7/106 |
| 9,830,632 | B2* | 11/2017 | Lenahan | G06Q 30/0625 |
| 9,910,825 | B1* | 3/2018 | Garman | G06Q 10/02 |
| 9,918,130 | B2* | 3/2018 | Warrick | H04N 7/106 |
| 9,953,337 | B2* | 4/2018 | Skaf | G06Q 30/0231 |
| 2001/0044751 | A1* | 11/2001 | Pugliese, III | G06Q 30/02 |
| | | | | 705/14.1 |
| 2003/0200142 | A1* | 10/2003 | Hicks | G06Q 30/02 |
| | | | | 705/14.27 |
| 2004/0158536 | A1 | 8/2004 | Kowal et al. | |
| 2004/0215512 | A1* | 10/2004 | Farat | G06Q 30/02 |
| | | | | 705/14.27 |
| 2005/0144074 | A1* | 6/2005 | Fredregill | G06Q 20/102 |
| | | | | 705/14.27 |
| 2006/0247972 | A1* | 11/2006 | Baron | G06Q 30/0224 |
| | | | | 705/14.25 |
| 2011/0022468 | A1* | 1/2011 | Muster | G06Q 30/00 |
| | | | | 705/14.58 |
| 2011/0035278 | A1* | 2/2011 | Fordyce, III | G06Q 20/10 |
| | | | | 705/14.49 |
| 2011/0055770 | A1* | 3/2011 | Hed | G06Q 10/02 |
| | | | | 715/854 |
| 2011/0218884 | A1* | 9/2011 | Kothari | G06Q 30/02 |
| | | | | 705/27.1 |
| 2011/0251882 | A1* | 10/2011 | Richard | G06Q 30/02 |
| | | | | 705/14.25 |
| 2011/0302022 | A1* | 12/2011 | Fordyce, III | G06Q 20/10 |
| | | | | 705/14.35 |
| 2011/0314502 | A1* | 12/2011 | Levy | H04N 7/106 |
| | | | | 725/46 |
| 2012/0239482 | A1* | 9/2012 | McInnes | G06O 30/0207 |
| | | | | 705/14.27 |
| 2012/0290380 | A1* | 11/2012 | Paul | G06Q 10/02 |
| | | | | 705/14.33 |
| 2012/0296721 | A1 | 11/2012 | Malcolmson et al. | |
| 2013/0073377 | A1* | 3/2013 | Heath | G06Q 30/02 |
| | | | | 705/14.39 |
| 2013/0159087 | A1* | 6/2013 | Boyd | G06Q 30/06 |
| | | | | 705/14.33 |
| 2013/0304561 | A1* | 11/2013 | Warner | G06Q 30/0226 |
| | | | | 705/14.33 |
| 2014/0040003 | A1* | 2/2014 | Kothari | G06Q 30/02 |
| | | | | 705/14.33 |
| 2014/0100991 | A1* | 4/2014 | Lenahan | G06Q 30/0625 |
| | | | | 705/26.62 |
| 2014/0122214 | A1* | 5/2014 | Postrel | G06Q 20/06 |
| | | | | 705/14.33 |
| 2014/0189759 | A1* | 7/2014 | Warrick | H04N 7/106 |
| | | | | 725/82 |
| 2014/0195349 | A1* | 7/2014 | Muster | G06Q 30/00 |
| | | | | 705/14.58 |
| 2015/0081349 | A1* | 3/2015 | Johndrow | G06Q 20/3224 |
| | | | | 705/5 |
| 2015/0134372 | A1* | 5/2015 | Lopez Ruiz | G06Q 10/02 |
| | | | | 705/5 |
| 2015/0206072 | A1* | 7/2015 | Fabris | G06Q 30/0631 |
| | | | | 705/5 |
| 2015/0245085 | A1* | 8/2015 | Warrick | H04N 7/106 |
| | | | | 725/71 |
| 2015/0379550 | A1* | 12/2015 | Warner | G06Q 30/0226 |
| | | | | 705/14.33 |
| 2016/0005067 | A1* | 1/2016 | Warner | G06Q 30/0226 |
| | | | | 705/14.27 |
| 2016/0219333 | A1* | 7/2016 | Warrick | H04N 7/106 |
| 2017/0046732 | A1* | 2/2017 | Elmachtoub | G06Q 30/0243 |
| 2017/0142483 | A1* | 5/2017 | Warrick | H04N 21/4532 |
| 2018/0068235 | A1* | 3/2018 | Garman | G06Q 10/02 |

OTHER PUBLICATIONS

NASDAQ OMX Corporate Solutions Inc., New York, Jul. 23, 2014.*

Non Final Office Action dated Feb. 8, 2019 for U.S. Appl. No. 14/969,623 "Personalized Search Based on User Behavior" Davis, 28 pages.

Office Action for U.S. Appl. No. 14/969,623, dated Aug. 8, 2019, Davis, "Personalized Search Based on User Behavior", 34 pages.

Non Final Office Action dated Nov. 18, 2019 for U.S. Appl. No. 14/969,623 "Personalized Search Based on User Behavior" Davis, 34 pages.

* cited by examiner

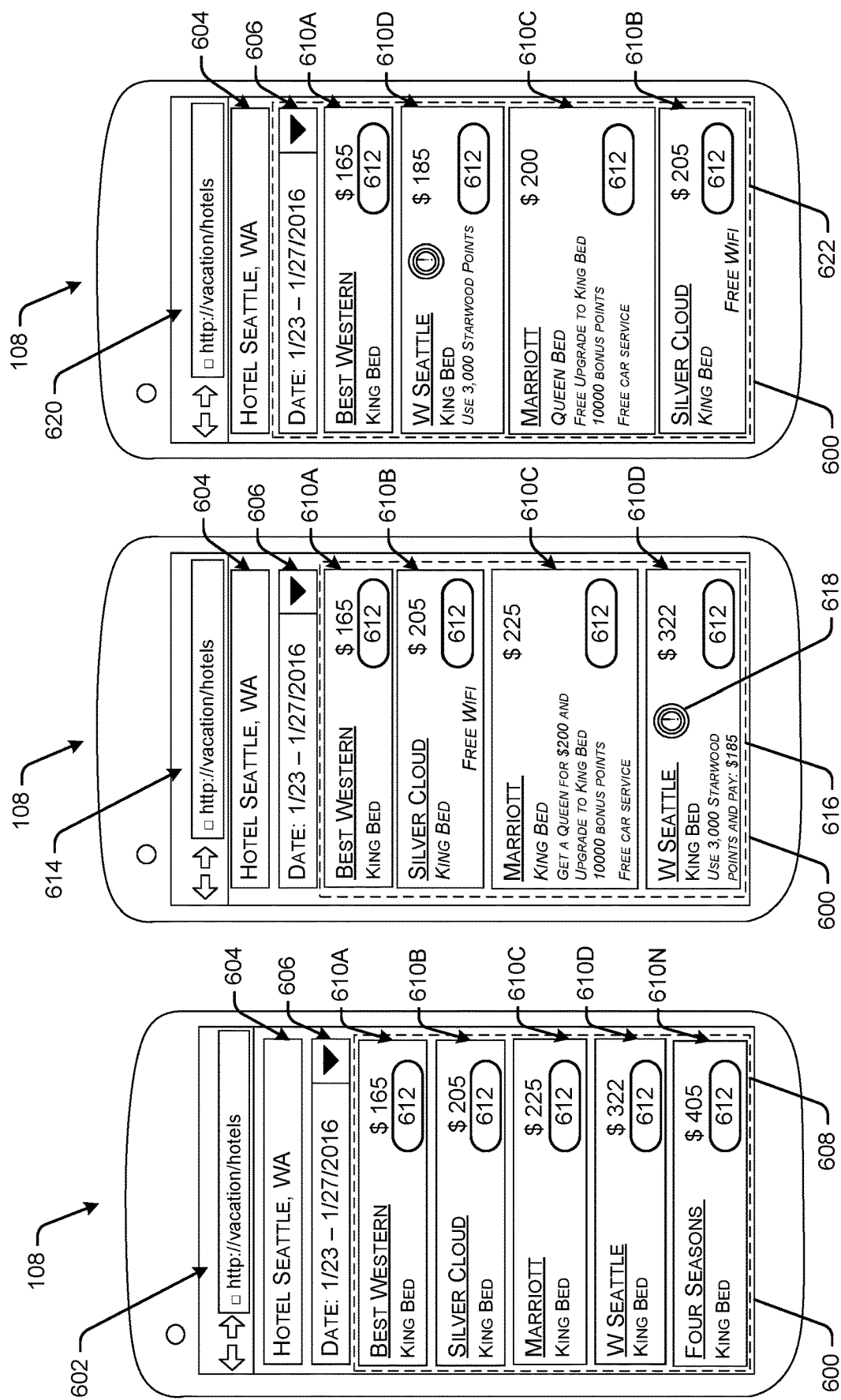

OPTIMIZED SEARCH USING REWARDS INFORMATION

BACKGROUND

Networks, such as the Internet, enable remotely located devices associated with consumers to exchange data with other devices associated with merchants. In some examples, a service provider may facilitate the data exchange. For instance, consumers, via remotely located devices, may send search queries to a service provider seeking information associated with goods or services offered by merchants. Responsive to receiving the search queries, the service provider may generate user interfaces configured to present search results and may cause the user interfaces to be presented via the remotely located devices associated with the consumers. The search results may be associated with goods or services offered by the merchants.

Generally, the search results are generic, such that the search results present the same information in the same order for all consumers submitting a same search query. As a result, a consumer will receive generic, non-customized search results, which may not be consistent with the interests or preferences of the consumer. Accordingly, the consumer may be required to spend a significant amount of time reviewing search results and may engage in a significant amount of interaction with the user interfaces to identify items of interest and/or acquire items offered for acquisition by merchants.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6A is a diagram showing an example user interface that may be presented via a display of a device that is configured to present a search engine results page.

FIG. 6B is a diagram showing an example user interface that may be presented via a display of a device that is configured to present a personalized search engine results page.

FIG. 6C is a diagram showing an example user interface that may be presented via a display of a device that is configured to present a personalized search engine results page.

DETAILED DESCRIPTION

Figure 1:
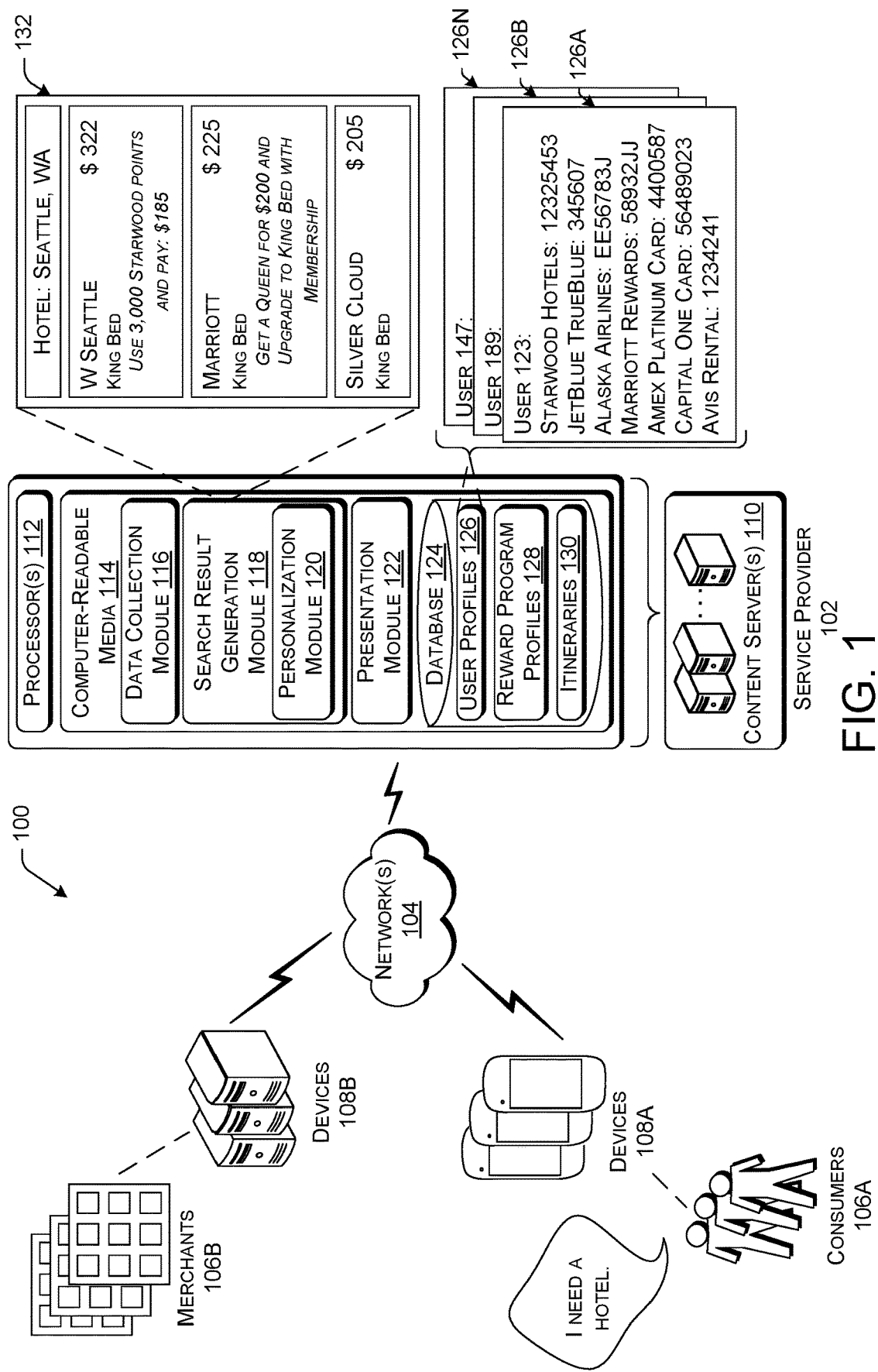
FIG. 1 is a diagram showing an example system for managing reward program membership information for generating personalized search engine results pages.

This disclosure describes a framework on which one or more applications associated with managing reward program memberships and corresponding rewards for generating personalized search engine results pages run. For the purpose of this discussion, reward programs may be programs available from merchants to reward consumers for their loyalty. Reward programs may provide consumers with various rewards such as discounted and/or free products or services, upgrades, etc. For instance, some reward programs reward consumers with points for purchases, activities, etc. that may be subsequently redeemed for discounted and/or free products or services. Additional and/or alternative reward programs reward consumers with different statuses/membership levels that avail particular rewards (e.g., early access, upgrades, invitations to private events, etc.), benefits such as trip insurance, etc.

The technologies described herein may leverage reward program memberships and corresponding rewards to personalize search results for consumers. A service provider may aggregate reward program data for a consumer. Based at least in part on receiving a search query from a device associated with a consumer or another user acting on behalf of the consumer, the service provider may access and/or receive generic search results. That is, responsive to receiving a search query, the service provider may access and/or receive search results that are universally applicable to all consumers searching for a same product or service. The service provider may access the reward program data associated with the consumer and may generate personalized search results. The service provider may generate a user interface configured to present the personalized search results to the consumer and may cause the user interface to be presented to the consumer. Accordingly, the consumer may review the search results and gain an understanding about how his or her membership to various reward programs may affect the consumer. Furthermore, the personalized search results may enable consumers to identify items of interest with an improved efficiency and may reduce the interaction required by the users to acquire items offered by merchants.

Furthermore, the consumer may interact with a control or other mechanism corresponding to a search result to acquire the product or service associated with the search result. Based at least in part on the consumer interaction with a control or other mechanism, the service provider may facilitate the redemption of any rewards that are redeemable by the consumer and/or facilitate the application of any rewards made available to the consumer. That is, instead of requiring the consumer to access each reward program with redeemable rewards individually, a single consumer interaction with the control or other mechanism may enable the service provider to facilitate the redemption of any rewards that are redeemable by the consumer and/or facilitate the application of any rewards made available to the consumer.

As a non-limiting example, a consumer may conduct a search for a hotel room with one king bed in a city. Resultant search results may include listings for a plurality of hotels and rates for each of the hotels. The rates (i.e., costs) may be universally applicable to all consumers searching for a hotel room with one king bed in the same city. As a non-limiting example, a hotel room with one king bed available from a first hotel may have the highest rate, a hotel room with one king bed available from a second hotel may have the second highest rate, and a hotel room with one king bed available from a third hotel may have the lowest rate. As described above, the search results may not consider discounts, giveaways, upgrades, etc. that are redeemable by the consumer based on his or her memberships to various reward programs.

The service provider may access reward program data associated with the consumer and may generate personalized search results for the consumer. For instance, a hotel room with one king bed available at the first hotel may be 20% off as a result of the consumer being a member of the first hotel's reward program. As such, the hotel room with one king bed available from the first hotel may be available at a rate that is less than the rate available at the third hotel, making it the least expensive option. Or, a hotel room with one queen bed available at the second hotel may be available at a rate less than the rate offered by the third hotel for the hotel room with the one king bed (e.g., the rate for the hotel room with one queen bed may be less than any of the hotel rooms with the one king bed), and may be subject to a free upgrade to a hotel room with one king bed based on the consumer's status/membership level with a reward program associated with the second hotel. Accordingly, the consumer may leverage his or her rewards to acquire a hotel room with one king bed at the second hotel for less than what he or she would have paid at the first hotel or the third hotel. Or, a hotel room with one king bed available at the first hotel may be available at no cost to the consumer based on a point cache associated with the consumer's membership in a reward program associated with the first hotel. Accordingly, the consumer may be able to acquire the hotel room with the king bed at the first hotel without having to pay any cash. Depending on the option selected by the consumer, the service provider may redeem applicable rewards and/or apply resulting rewards to reward accounts corresponding to the consumer's accounts with the reward programs.

In some examples, the service provider may leverage machine learning algorithms to identify individual search results where rewards may be redeemed most consistent with the consumer's preferences. For instance, some consumers may desire a particular status/membership level associated with a merchant that requires a threshold number of points. Accordingly, such consumers may prefer not to redeem points to purchase goods or services, even if redeeming points decreases the amount of cash that the consumer spends on an item. That is, such consumers are more likely to choose a product or service that has a best rate (i.e., cost) without requiring the consumers to redeem points. Alternatively, other consumers may prefer to minimize the amount of cash they spend by redeeming points to reduce the cost to the consumer. Accordingly, such consumers are likely to choose a product or service that has a best rate after any redeemable points have been redeemed. The service provider may learn such preferences and may take such preferences into account for determining which search results provide the most value to the consumer.

Moreover, in additional and/or alternative examples, the service provider may manage the reward program memberships and may make recommendations to consumers on how to maximize their rewards corresponding to various reward programs. In some examples, the service provider may leverage machine learning algorithms to learn consumer preferences and make recommendations consistent with such preferences. In additional and/or alternative examples, the service provider may identify rewards that are available from new reward programs and may recommend membership to the new reward programs to the consumer.

FIG. 1 is a diagram showing an example system 100 for managing reward program memberships and corresponding rewards for generating personalized search engine results pages. More particularly, the system 100 may include a service provider 102, one or more network(s) 104, consumers 106A and merchants 106B (collectively, users 106), and corresponding devices 108A and devices 108B (collectively, devices 108). In some examples, the users 106 may operate corresponding devices 108 to perform various functions associated with the devices 108, which may include at least some of the operations and/or modules discussed below with respect to the service provider 102.

The service provider 102 may be any entity, server(s), platform, etc., that provides items (e.g., products, services, etc.) to consumers 106A on behalf of merchants 106B and/or service providers. Additionally and/or alternatively, the service provider 102 may be any entity, server(s), platform, etc., that provides travel planning services to consumers 106A. For the purpose of this discussion, travel planning services may be services offered by the service provider 102 to provide travel and tourism related services on behalf of the service provider 102 and/or merchants 106B supplying airline services, car rental services, cruise services, temporary accommodation, hotel, and resort services, railway services, tour services, itinerary planning services, etc. The service provider 102 may be implemented in a non-distributed computing environment or may be implemented in a distributed computing environment, possibly by running some modules on devices 108 or other remotely located devices.

As shown, the service provider 102 may include one or more content server(s) 110, which may include one or more processor(s) 112 and computer-readable media 114. The content server(s) 110 may also include additional components not listed above that may perform any function associated with the content server(s) 110. In various embodiments, each of the content server(s) 110 may be any type of server, such as a network-accessible server. In various examples, the processor(s) 112 may execute one or more modules and/or processes to cause the content server(s) 110 to perform a variety of functions, as set forth above and explained in further detail in the following disclosure. In some embodiments, the processor(s) 112 may include a central processing unit (CPU), a graphics processing unit (GPU), both a CPU and a GPU, or other processing units or components known in the art. Additionally, each of the processor(s) 112 may possess its own local memory, which also may store program modules, program data, and/or one or more operating systems.

In at least one configuration, the computer-readable media 114 of the content server(s) 110 may include one or more modules and data structures including, for example, a data collection module 116, a search result generation module 118, including a personalization module 120, a presentation module 122, and a database 124. The database 124 may store data in user profiles 126, reward program profiles 128, itineraries 130, etc. as described below. The one or more modules and data structures may be in the form of stand-alone applications, productivity applications, an operating system component, or any other application or software module having features that facilitate interactions between the devices 108A and the service provider 102. Depending on the exact configuration and type of the content server(s) 110, the computer-readable media 114 may also include volatile memory (such as RAM), non-volatile memory (such as ROM, flash memory, miniature hard drive, memory card, or the like), or some combination thereof.

In various examples, the service provider 102 may present items to consumers 106A on behalf of itself, merchants 106B, etc. The items may include products, services, combinations of products and services, etc. For the purpose of this discussion, the products, services, etc. may include, but are not limited to, travel related products and/or services such as flights, hotel rooms, rental cars, admission to attractions, itinerary recommendations, etc. The network(s) 104 may facilitate communication between the content server(s) 110 and/or the devices 108 associated with the users 106. In some examples, the network(s) 104 may be any type of network known in the art, such as the Internet. Moreover, the service provider 102 and/or the devices 108 may communicatively couple to the network(s) 104 in any manner, such as by a wired or wireless connection.

The users 106 may interact with the service provider 102 via a site (i.e., a website), a self-service merchant portal, a self-service interface, or in any other manner. In at least one example, consumers 106A may interact with the service provider 102 to acquire one or more items that are offered for acquisition on behalf of the merchants 106B and/or the service provider 102. In some examples, the service provider 102 may generate and present user interfaces for presenting one or more items to a consumer 106A. In at least one example, the user interfaces may present the one or more items to a consumer 106A in a search engine results page displaying a plurality of search results returned by a search engine in response to a search query. Each search result may correspond to a listing associated with the one or more items. In some examples, as described below, an item may be an itinerary including one or more components. The listing may be associated with a merchant 106B and/or a service provider 102. The listing may be associated with a cost for acquiring the one or more items. Generally, the cost is presented as a cash value (e.g., cash cost); however, the cost may be associated with any other value standardized across merchants 106B and/or service providers 102.

As described above, the service provider 102 may generate personalized search results. In some examples, the service provider 102 may make modifications to initial search results returned responsive to the search query, as illustrated in FIG. 6A, and may generate a user interface that includes personalized search results based on rewards redeemable as a result of a consumer's 106A reward program memberships. In other examples, the service provider 102 may generate personalized search results based at least in part on the initial search results. FIG. 1 illustrates a non-limiting example of a user interface 132 that includes a portion of a personalized search engine results page of personalized search results based on a consumer's 106A reward program memberships. Additional examples of personalized search engine results pages are illustrated in FIGS. 6B and 6C.

In various examples, a consumer 106A may acquire an item by actuating a control on a user interface presented on a display of a corresponding device 108A to acquire the item. The control may be associated with a hyperlink or an overlay that directs the consumer 106A to a new user interface and prompts the consumer 106A to input information for acquiring the item (e.g., banking information, etc.). In some examples, the control may be associated with individual search results in a corresponding search engine results page. In other examples, the control may be associated with item detail pages associated with each search result. Item detail pages may be accessible based at least in part on actuating a mechanism (e.g., a control, a hyperlink, etc.) associated with a search result. Item detail pages may provide additional information about an item corresponding to the search result. In at least one example, based at least in part on a consumer 106A actuating a control to acquire an item, the service provider 102 may facilitate any applicable rewards transactions by virtue of redeeming rewards to acquire an item. That is, the service provider 102 may add rewards to a reward account associated with a reward program, subtract rewards from a reward account associated with a reward program, etc.

For the purpose of this discussion, a consumer 106A may acquire an item such that the consumer 106A may purchase an item (e.g., purchase tickets to an event), rent an item (e.g., rent a car), be granted access to use an item (e.g., be granted access to use a hotel room), etc. In at least one example, based at least in part on acquiring an item over the computer network, a consumer 106A may receive information to access the item upon arrival at the merchant 106B (or a representative of the merchant 106B) and/or receive means for accessing the item via physical mail, email, etc. For instance, based at least in part on a consumer 106A making reservations for accommodations (e.g., acquiring the item) corresponding to a search result, the consumer 106A may receive a confirmation number so that the consumer 106A may access the temporary accommodations upon arrival at the merchant 106B (or a representative of the merchant 106B). Or, based at least in part on a consumer 106A purchasing tickets to a sporting event (e.g., acquiring the item) corresponding to a search result, the consumer 106A may receive tickets to the sporting event in his or her email or via physical mail.

In at least one example, merchants 106B may interact with the service provider 102 to offer one or more items for acquisition or use by consumers 106A. In various examples, the merchants 106B may be any individual or entity that is a source or a distributor of items that may be acquired or used by the consumers 106A. For example, the merchants 106B may include entities that provide products or services to consumers 106A, which may be offered or promoted directly by the merchants 106B or by the service provider 102 or on behalf of the merchants 106B. As described above, in some examples, the merchants 106B may provide travel planning services to consumers 106A such as, but not limited to, airline services, car rental services, cruise services, temporary accommodation, hotel, and resort services, railway services, tour services, itinerary planning services, etc. The merchants 106B may also offer items via a physical location (e.g., a brick-and-mortar store, lodging establishment, etc.), a merchant-branded merchant site (e.g., website), an intermediary marketplace, etc. The merchants 106B may provide items to the consumers 106A with the assistance of any type of device (e.g., devices 108A, devices 108B, etc.).

In some examples, the merchants 106B may interact with the service provider 102 to provide information about corresponding reward programs. In some examples, merchants 106B may have their own reward programs. In other examples, merchants 106B may be associated with a reward program that includes a plurality of merchants 106B. In at least one example, third-party service providers may facilitate the reward program on behalf of the one or more merchants 106B. Additional and/or alternative entities may also offer reward programs as described herein.

As described above, in at least one configuration, the computer-readable media 114 of the content server(s) 110 may include one or more modules and data structures including, for example, the data collection module 116, the search result generation module 118, including the personalization module 120, the presentation module 122, and the database 124.

The data collection module 116 may access, receive, and/or determine data associated with consumers 106A. The data collection module 116 may receive data from a variety of sources including the consumers 106A, the merchants 106B, the service provider 102, etc.

In at least one example, the data collection module 116 may access, receive, and/or determine data associated with reward programs. For instance, the data collection module 116 may access, receive, and/or determine data associated with a consumer's 106A reward program membership information, including, but not limited to, a consumer's 106A unique identifiers (e.g., username, membership number, etc.) for accessing various reward programs. A unique identifier for a particular reward program may map to a reward account corresponding to a particular consumer 106A for the particular reward program.

Additionally, the data collection module 116 may access, receive, and/or determine data associated with user information and/or user actions associated with the reward programs. For instance, the data collection module 116 may access, receive, and/or determine data associated with a consumer's status/membership level with respect to a reward program, a number of points associated with a consumer's reward account corresponding to a reward program, available upgrades associated with a consumer's reward account corresponding to a reward program, etc. Furthermore, the data collection module 116 may access, receive, and/or determine data associated with actions taken by a consumer 106A corresponding to a reward account, such as when a consumer 106A redeems points, redeems discounts, redeems upgrades, changes status/membership level, etc. In some examples, the data collection module 116 may receive and/or access such information from the merchants 106B associated with the reward programs. In other examples, the data collection module 116 may receive and/or access such information from third-party service providers managing the reward programs on behalf of the merchants 106B associated with the reward programs. In yet additional and/or alternative examples, the data collection module 116 may be granted access to consumer accounts associated with the reward programs.

Generally, a consumer 106A may be provided with notice that the systems and methods herein are accessing data associated with user information and/or user actions associated with the reward programs from the merchants 106B associated with the reward programs and/or third-party service providers managing the reward programs on behalf of the merchants 106B associated with the reward programs. Additionally, prior to accessing data associated with user information and/or user actions associated with the reward programs, consumers 106A may have an opportunity to opt-in or opt-out of allowing the service provider 102 to access the data. For example, consumers 106A may opt-in by taking affirmative action indicating that he or she consents to allowing the service provider 102 to access his or her data. Alternatively, consumers 106A may be presented with an option to opt-out. An opt-out option may require an affirmative action to opt-out of allowing the service provider 102 to access his or her data, and in the absence of affirmative user action to opt-out, access to data associated with user information and/or user actions associated with the reward programs may be impliedly permitted.

Additionally and/or alternatively, the data collection module 116 may access, receive, and/or determine data associated with user information and/or user actions associated with a retail purchase account corresponding to a consumer 106A (e.g., redemptions, purchases, sales, reservations, items on a saved-items list (i.e., a wish-list), exchanges, returns, browsing history, search history, recommendations, personal demographic information, location proximity, calendar information, etc.). Furthermore, the data collection module 116 may access, receive, and/or determine data associated with user information and/or user actions associated with third-party sources and systems (e.g., social networks, professional networks, partner webstore purchases, etc.). The data corresponding to the user information and/or user actions may be mapped to, or otherwise associated with, a user profile 126 corresponding to a consumer 106A that may be stored in the database 124, cloud storage system, or other data repository.

In addition to accessing, receiving, and/or determining data associated with user information and/or user actions, in at least one example, the data collection module 116 may access, receive, and/or determine data associated with the reward programs. In some examples, the data collection module 116 may develop relationships with merchants 106B associated with the reward programs and/or third-party service providers managing the reward programs on behalf of the merchants 106B to access and/or receive information about respective reward programs. For instance, the merchants 106B and/or third-party service providers may provide terms and conditions associated with respective reward programs, rewards that are available via respective reward programs, terms associated with individual rewards, statuses/membership levels that are available via respective reward programs, etc. The data corresponding to various reward programs may be mapped to, or otherwise associated with, respective reward program profiles 128 that may be stored in the database 124, cloud storage system, or other data repository.

The search result generation module 118 may be configured to generate personalized search engine results pages. In at least one example, the search result generation module 118 may receive a search query for an item from a device 108A. In some examples, the device 108A may correspond to a consumer 106A. In other examples, the device 108A may correspond to someone other than the consumer 106A who may be planning travel or otherwise acquiring items on behalf of the consumer 106A. In such examples, the search result generation module 118 may determine that the search query is associated with the consumer 106A based at least in part on identifying an account (e.g., retail purchase account, rewards program account, etc.) associated with the search query or based at least in part on the consumer 106A otherwise identifying him or herself.

A consumer 106A, or someone acting on behalf of the consumer 106A, may input a word or set of words related to an item into a search bar of a search engine associated with the service provider 102. In some examples, the search query may correspond to a travel destination. The search result generation module 118 may leverage search algorithms to access, receive, and/or determine generic search results. That is, responsive to receiving a search query, the search result generation module 118 may access, receive, and/or generate search results that are universally applicable to all consumers 106A searching for a same item. An example user interface configured to present generic search results via a search engine results page is illustrated in FIG. 6A and is discussed below. The individual search results in the search engine results page may be associated with multiple merchants 106A and/or service providers 102.

For the purpose of this discussion, a search result may represent a listing by a merchant 106B and/or service provider 102 that is offering an item (e.g., product, service, etc.) for acquisition. In some examples, items associated with individual search results may be itineraries, as described herein. The listing may be accessible via actuation of a mechanism such as a hyperlink or overlay corresponding to the search result. A listing may include at least a description of the merchant 106B and/or service provider 102, a description of the item, and a cost for acquiring a corresponding item. The cost may be a cash cost or any other value standardized across merchants 106B and/or service providers (e.g., service provider 102, etc.).

Each listing may be associated with data (i.e., listing data) indicating information about a corresponding item and/or data indicating terms for acquiring the item. For instance, non-limiting examples of data indicating information about an item may include data indicating a merchant 106B offering the item, item details, ratings/reviews, etc. For a hotel room, for example, the item details may include the number of guests in the party, the size of beds requested (e.g., queen, king, etc.), a type of room requested (e.g., standard, premium, suite, etc.), etc. For a garment, for example, the item details may include a size associated with the item, a fit associated with the item, etc. Non-limiting examples of data indicating terms for acquiring the item may include a cost of the item, restrictions and/or limitations on reward redemption, blackout dates, etc.

The search result generation module 118 may access the reward program data associated with a user profile 126 corresponding to the consumer 106A and, based at least in part on identifying rewards that are redeemable for one or more search results, may generate personalized search engine results pages. In at least one example, the search result generation module 118 may access each search result and may compare the data associated with the corresponding listing (i.e., listing data) with data associated rewards that are available to a consumer 106A (i.e., reward data) by virtue of the consumer's 106A membership in various reward programs. That is, reward program data may identify rewards that are available from reward programs.

Each reward may be associated with data (i.e., reward data). The reward data may indicate terms for redeeming the reward. For instance, the data may include data indicating items the reward can be redeemed for, a number of points that are available for redemption, conditions associated with redeeming the points, upgrades that are available for redemption, conditions associated with redeeming the upgrades, discounts that are available for redemption, conditions associated with redeeming the discounts, a date and/or time associated with an expiration of a reward, benefits related to redemption of the reward, etc.

The search result generation module 118 may compare the listing data and the reward data to determine whether at least a portion of the listing data and at least a portion of the reward data match. Based at least in part on determining a match between at least a portion of the listing data and at least a portion of the reward data, the search result generation module 118 may determine that an available reward is redeemable for the listing. The search result generation module 118 may process each search result returned in a search engine results page to determine whether any rewards that are available are redeemable for the listing. In some examples, a same reward may be applicable to different search results. For instance, if STARWOOD® Hotels is offering a particular reward to STARWOOD® Preferred Guests, the same reward may apply for a search result for a hotel room at WESTIN® hotels, SHERATON® hotels, W HOTELS®, etc.

In a non-limiting example, the search result generation module 118 may access a search result associated with a three night stay in a hotel room with a king bed offered by the WESTIN®. The listing data may include data indicating that the listing is associated with a three night stay, a king bed, a WESTIN® hotel, etc. The search result generation module 118 may access reward program data associated with a first reward program (e.g., STARWOOD® Preferred Guests, the reward program associated with STARWOOD® Hotels). Based at least in part on accessing the reward program data, the search result generation module 118 may determine that STARWOOD® Hotels is offering a third night free with a reservation for two nights to STARWOOD® Preferred Guests. That is, the search result generation module 118 may determine that a reward is available from the first reward program. Reward data may indicate that the reward is available for any STARWOOD® Hotels purchase for two or more nights, that the reward expires on a predetermined date in the future, that the reward is available to all STARWOOD® Preferred Guests (e.g., a threshold number of points or threshold status is not required, etc.), etc. Based at least in part on comparing the listing data with the reward data, the search result generation module 118 may determine that at least a portion of the listing data and at least a portion of the reward data match. That is, the search result generation module 118 may determine that the consumer 106A is a STARWOOD® Preferred Guest, that the WESTIN® is a STARWOOD® Hotel, that the date of the stay is prior to the date that the reward expires, and that the length of the stay is longer than two nights. Accordingly, the search result generation module 118 may determine that the reward associated with the first reward program is redeemable for the listing.

Additionally, the search result generation module 118 may access reward program data associated with a second reward program (e.g., a credit card reward program). Based at least in part on accessing the reward program data, the search result generation module 118 may determine that a consumer 106A has one or more rewards that are available from the second reward program. The reward data may indicate a number of points available to the consumer 106A, items that the points are redeemable for, merchants 106B and/or service providers 102 that the points are redeemable at, expiration of the points, a dollar equivalence of the points, etc. For instance, the reward data may indicate that the consumer 106A has 600,000 points available, that points are redeemable at the WESTIN®, that one night at the WESTIN® is equivalent to 200,000 points, that the points expire at a predetermined date in the future, etc. Additionally, rewards program data may indicate that a second reward available via the second reward program. The reward data may identify that trip insurance is applicable to all travel related purchases made via the corresponding credit card. Based at least in part on comparing the listing data with the reward data, the search result generation module 118 may determine that at least a portion of the listing data and at least a portion of the reward data match. That is, the search result generation module 118 may determine that 600,000 points may enable the consumer 106A to stay at the WESTIN® for three nights (200,000 points/night) at no cost to the consumer 106A (i.e., free) and that the travel related purchase qualifies for trip insurance. Accordingly, the search result generation module 118 may determine that the rewards associated with the second reward program are redeemable for the listing.

Based at least in part on determining that rewards are redeemable for a respective listing, the search result generation module 118 may personalize the corresponding search result to reflect that rewards are redeemable. In some examples, the search result generation module 118 may annotate each search result with information relevant to a reward that is redeemable by the consumer 106A by virtue of his or her membership in a corresponding reward program. An example of a personalized search engine results page with annotations corresponding to redeemable rewards is illustrated in FIG. 6B and described below. In additional and/or alternative examples, the search result generation module 118 may modify a cost presented in association with a search result based at least in part on determining a redeemable reward for the corresponding listing, thereby generating personalized search results. The modified cost may reflect the cost of the item associated with the search result after redeemable rewards are redeemed. An example of a personalized search engine results page wherein costs of individual search results are modified to reflect redemption of redeemable rewards is illustrated in FIG. 6C and described below.

As described above, in at least one example, the search result generation module 118 may annotate each search result with information relevant to a reward that is redeemable by the consumer 106A by virtue of his or her membership in a corresponding reward program. As a result of a consumer 106A belonging to multiple reward programs, as described above, one or more rewards may be redeemable for an individual search result. For instance, a first reward program may offer the consumer 106A 30% off of the item in the returned search result by virtue of membership in the first reward program, a second reward program may offer the consumer 106A a free upgrade by virtue of membership in the second reward program, or a third reward program may offer the consumer 106A a free massage or free breakfast by virtue of membership in the third reward program. The search result generation module 118 may annotate the respective search result with information corresponding to the first reward program, the second reward program, and/or the third reward program.

In at least one example, individual search results may have a limited amount of space on the search engine results page. Accordingly, in some examples, the number of redeemable rewards may exceed space on the user interface allocated for an individual search result. That is, a particular search result may have so many redeemable rewards that the user interface may not be able to show all of the rewards on the search engine results page. In such examples, the search result generation module 118, via the personalization module 120 described below, may prioritize which rewards are presented to the consumer 106A and/or the order in which the rewards are presented to the consumer 106A.

In some examples, the search result generation module 118 may prioritize a reward that reduces the cost of the item by the largest amount. In other examples, the personalization module 120, described below, may prioritize rewards based at least in part on determined preferences of the consumer 106A. That is, the one or more rewards that are likely to be the most desirable to the consumer 106A are presented to the consumer 106A prior to rewards that are less desirable to the consumer 106A. When multiple rewards are redeemable by a consumer 106A, and fewer than all of the rewards are shown on the search engine results page, the search result generation module 118 may cause a control to be added to the search result on the search engine results page to enable the consumer 106A to view additional and/or alternative rewards upon actuation of the control and/or may add information about the additional rewards to the item detail page.

As described above, in additional and/or alternative examples, the search result generation module 118 may modify a cost presented in association with a search result based at least in part on determining a redeemable reward for the corresponding listing, thereby generating personalized search results. For instance, a first reward program may offer the consumer 106A 30% off of an item listed via a search result. Accordingly, the search result generation module 118 may modify a cost presented by a respective search result to reflect the reduced cost (e.g., 30% off) in the search engine results page. Or, a second reward program may offer the consumer 106A a free item based on a number of points the consumer 106A has earned. Accordingly, the search result generation module 118 may modify the cost presented by a respective search result to reflect the reduced cost (e.g., $0/30,000 STARWOOD® points) in the search engine results page.

As a result of a consumer 106A belonging to multiple reward programs, as described above, one or more rewards may be redeemable for a listing corresponding to a search result. In some examples, the search result generation module 118, via the personalization module 120, may modify the cost based on the reward that reduces the cost of the item by the largest amount. In other examples, the search result generation module 118, via the personalization module 120, may make a modification based at least in part on determined preferences of the consumer 106A. That is, the search result generation module 118 may modify a presentation of a search result to reflect redemption of one or more rewards that are likely to be the most desirable to the consumer 106A. Additional and/or alternative rewards may be annotated on the search result on the search engine results page and/or may be available on item detail pages corresponding to the search result.

In some examples, the search results may be ranked based at least in part on cost, rating, proximity to a predetermined geographic location, etc. In additional and/or alternative examples, the search result generation module 118 may rank the personalized search results based at least in part on a value score, described below. The search results may appear in a position corresponding to a ranking in a personalized search engine results page.

The personalization module 120 may determine consumer preferences that the personalization module 120 may leverage to personalize search results for the search engine results page. In at least one example, the personalization module 120 may utilize machine learning algorithms to determine preferences of the consumers 106A. The machine learning algorithms may include a supervised learning algorithm (e.g., artificial neural networks, Bayesian statistics or networks, Gaussian process regression, logistic model trees, support vector machines, etc.), an unsupervised learning algorithm (e.g., artificial neural networks, association rule learning, hierarchical clustering, cluster analysis, etc.), a deep learning algorithm, etc. The machine learning algorithms may access data associated with consumers 106A such as, data associated reward program membership information, user information and/or user actions associated with reward programs, user information and/or user actions associated with a retail purchase account, user information and/or user actions associated with third-party sources and systems, etc. The machine learning algorithms may identify consumer preferences with respect to how individual consumers 106A prefer to use rewards. Data corresponding to such preferences may be stored in the database 124, mapped to, or otherwise associated with, respective user profiles 126 or otherwise associated with the respective user profiles 126.

For instance, as a non-limiting example, a first consumer 106A may show a propensity to use rewards to reduce the cost of an item each time an opportunity to use rewards for such a purpose is presented and a second consumer 106A may show a propensity to pay a higher cost to increase a number of points associated with individual reward programs (perhaps, to attain and/or maintain a status/membership level and the perks that come along with the status/membership level). Or, a first consumer 106A may show a propensity to use rewards with respect to a particular reward program over any other reward program all of the time and a second consumer 106A may show a propensity to use whatever rewards amount to the lowest cost/greatest benefits for the second consumer 106A. Additionally and/or alternatively, a first consumer 106A may show a propensity to choose particular brands or items with particular ratings over other brands or items with particular ratings, in spite of the cost. The machine learning algorithms may observe the propensities and learn such preferences. Data corresponding to such preferences may be stored in the database 124, mapped to, or otherwise associated with, respective user profiles 126.

The personalization module 120 may leverage the machine learning algorithms to personalize search results in a search engine results page based at least in part on determined preferences of the consumers 106A. For instance, as described above, as a result of a consumer 106A belonging to multiple reward programs, one or more rewards may be redeemable for a listing corresponding to a search result. In such examples, the search result generation module 118 may annotate the search result indicating one or more of the redeemable rewards. In at least one example, the number of redeemable rewards may exceed space on the user interface allocated for a search result. In some examples, the search result generation module 118 may prioritize which rewards are presented to the consumer 106A and/or the order in which the rewards are presented to the consumer 106A based at least in part on determined preferences of the consumer 106A. That is, the personalization module 120 may determine that one or more rewards are likely to be the most desirable to the consumer 106A and accordingly, the search result generation module 118 may cause the one or more rewards that are likely to be the most desirable to the consumer 106A to be presented to the consumer 106A prior to rewards that are less desirable to the consumer 106A.

In other examples, the personalization module 120 may modify the cost presented with a search result based at least in part on determined preferences of the consumer 106A. That is, the personalization module 120 may determine that one or more rewards are likely to be the most desirable to the consumer 106A and accordingly, may modify the cost associated with the search result to reflect a new cost determined based at least in part on redemption of the one or more rewards that are likely to be the most desirable to the consumer 106A. The search result generation module 118 may annotate the search result with additional and/or alternative rewards or may cause the additional and/or alternative rewards to be presented on an item detail page, as described above.

In some examples, the personalization module 120 may access the data corresponding to the user preferences stored in the database 124 to determine consumers' preferences with respect to how they redeem rewards that are available to and redeemable by them, and may manage reward programs and resulting rewards to determine how to maximize a benefit to the consumers 106A consistent with their preferences. For instance, the personalization module 120 may evaluate each of the personalized search results and identify one or more personalized search results that maximize the benefit to the consumer 106A consistent with the consumer preferences, as described above. In at least one example, the personalization module 120 may cause a graphical indicator to be presented in association with a search result that maximizes the benefit to the consumer 106A consistent with the user preferences to inform the consumer 106A that a particular search result is best for maximizing the rewards for the consumer 106A consistent with the user preferences. A non-limiting example of a graphical indicator is illustrated in FIG. 6B.

In other examples, the personalization module 120 may evaluate the rewards that are redeemable for a listing corresponding to a search result and may determine a value score associated with the search result. For instance, the personalization module 120 may leverage an algorithm to compute the value of the rewards that are redeemable for a listing corresponding to a search result. Initially, the algorithm may have predetermined weights associated with different types of payment and/or rewards (e.g., cash, points, upgrades, status/membership level, insurance, etc.). For instance, cash may be associated with a first weight, redeemable points may be associated with a second weight, redeemable upgrades may be associated with a third weight, etc. The value score may indicate how valuable a suggested method of payment, inclusive of redeemable rewards, is for a consumer 106A.

Initially, the algorithm may be weighted to indicate a cash equivalency for rewards. For instance, in a non-limiting example, a value score associated with a listing that enables a consumer 106A to acquire an item at no cash cost to the consumer 106A but instead will cost the consumer 50,000 points may be greater than a value score associated with a listing that enables a the consumer 106A to acquire the item for $330. That is, the value score may indicate that 50,000 points are worth less to the consumer 106A than $330. Or, that redeeming the points is a better value for the consumer 106A than spending $330.

As a consumer 106A selects different search results and corresponding methods of payments, the weights associated with the algorithm may change to reflect preferences of the consumer 106A. For instance, if a consumer 106A values status/membership levels over cash expenditure, the second weight associated with redeemable points may be weighted heavier than the first weight associated with cash. For instance, in the non-limiting example above, if a consumer 106A indicates a preference towards conserving points, a value score associated with a listing that enables the consumer 106A to acquire the corresponding item at no cash cost to the consumer 106A but instead will cost the consumer 50,000 points may be less than a value score associated with a listing that enables the consumer 106A to acquire the item for $330 and will enable the consumer 106A to retain the 50,000 points. That is, the value score may indicate that 50,000 points are more valuable to the consumer 106A than $330 and that spending the cash is a better value for the customer 106A, in view of the preferences associated with the consumer 106A.

In some examples, the search result generation module 118 may leverage the value scores to rank the search results in the personalized search engine results pages. For instance, search results associated with a highest value score may be ranked at the top of a search engine results page and search results with a lowest value score may be ranked at the bottom of a search engine results page. In other examples, the value score may be utilized to determine recommendations of search results to consumers 106A and/or when to cause the graphical indicator described above to be presented in association with individual search results. For instance, in some examples, a search result with a highest value score may be recommended to a consumer 106A via the search result generation module 118. In additional and/or alternative examples, the value score may be added to corresponding search results on the personalized search engine results page.

In at least one example, the personalization module 120 may compare search results to all reward programs having a respective reward program profile 128 and may identify rewards that are available from reward programs and may be redeemable by a consumer 106A if the consumer 106A joins a new reward program. The personalization module 120 may recommend new reward programs to the consumers 106A. In some examples, the personalization module 120 may access data associated with corresponding user profiles 126 to auto-fill reward program applications for ease of the consumer 106A.

The presentation module 122 may generate user interfaces and cause the user interfaces to be presented to consumers 106A via displays on corresponding devices 108A. In alternative examples, modules other than the presentation module 122 may generate the user interfaces and/or content to be included in the user interfaces and the presentation module 122 may cause the user interfaces to be presented via displays of devices 108A. The presentation module 122 may cause user interfaces configured to present personalized search engine results pages to be presented to consumers 106A, as illustrated in FIGS. 6B and 6C. The presentation module 122 may cause the user interfaces to be presented to the consumer 106A via a website, text message, an email, a push notification, etc. The presentation module 122 may cause user interfaces to be presented to consumers 106A responsive to receiving search queries from the consumers 106A.

The database 124 may store data that is organized so that it may be accessed, managed, and updated. In at least one example, the database 124 may include data associated with individual consumers 106A that may be arranged in user profiles 126. In some examples, a user profile 126 may correspond to a retail purchase account associated with the service provider 102. A user profile 126 may have various data items associated with consumers 106A, as described above, which may be mapped to, or otherwise associated with, the user profile 126. For instance, in some examples, a user profile 126 may be mapped to data associated with a consumer 106A such as reward program membership information, user information and/or user actions associated with reward programs, user information and/or user actions associated with a retail purchase account, user information and/or user actions associated with third-party sources and systems, etc. User profiles 126A, 126B, and 126N illustrate non-limiting examples of reward program membership information that may be mapped to the user profiles 126. Additional and/or alternative data may be mapped to, or otherwise associated with, the user profiles 126, as described above.

Additionally and/or alternatively, the database 124 may include data associated with various reward programs that may be arranged in reward program profiles 128. For instance, the merchants 106B may provide terms and conditions, rewards that are available, statuses/membership levels, etc. corresponding to the different reward programs and corresponding data may be mapped to, or otherwise associated with, the respective reward program profiles 128. The database 124 may receive updated data responsive to changes to reward programs, in predetermined frequencies, after a lapse of a predetermine period of time, etc.

In some examples, the database 124 may include itineraries 130. An itinerary 130 may include accommodations, one or more attractions (e.g., restaurants, activities, etc.), transportation, etc. associated with travel destinations and/or a route for visiting the one or more attractions. In some examples, the itinerary 130 may be limited to attractions associated with the travel destination, or may include travel to and from the travel destination. In some examples, the itineraries 130 may be semi-automatically generated by the service provider 102 based on content items (e.g., photos, videos, social media posts, microblog posts, blog posts, etc.) generated by consumers 106A that have previously visited the travel destination. In other examples, the itineraries 130 may be generated by other processes and stored in the database 124.

FIGS. 2-5 describe example processes for accessing reward program data associated with consumers 106A for generating personalized search results to reflect redeemable rewards. The example processes are described in the context of the environment of FIG. 1 but are not limited to that environment. The processes are illustrated as logical flow graphs, each operation of which represents a sequence of operations that may be implemented in hardware, software, or a combination thereof. In the context of software, the operations represent computer-executable instructions stored on one or more computer-readable media 114 that, when executed by one or more processors 112, perform the recited operations. Generally, computer-executable instructions include routines, programs, objects, components, data structures, and the like that perform particular functions or implement particular abstract data types.

The computer-readable media 114 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments the computer-readable media 114 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

Figure 2:
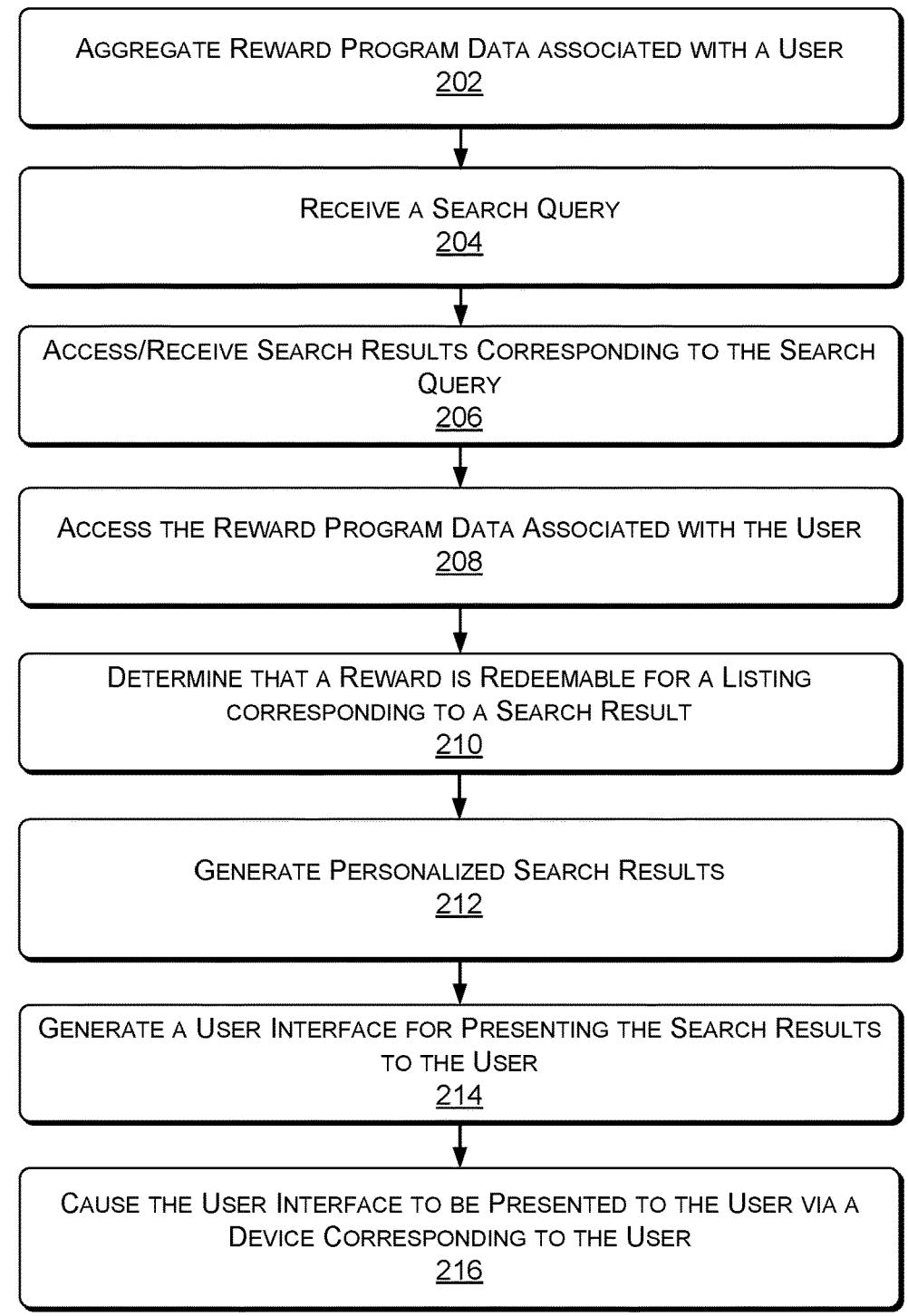
FIG. 2 is a flow diagram showing an illustrative process to generate personalized search engine results pages.

FIG. 2 is a flow diagram showing an illustrative process 200 to generate personalized search engine results pages.

Block 202 illustrates aggregating reward program data associated with a user (e.g., consumer 106A). In at least one example, the data collection module 116 may access, receive, and/or determine data associated with reward programs. For instance, the data collection module 116 may access, receive, and/or determine data associated with a consumer's 106A reward program membership information, including, but not limited to, a consumer's 106A unique identifiers (e.g., username, membership number, etc.) for accessing various reward programs. The data associated with a consumer's 106A reward program membership information may be mapped to, or otherwise associated with, a user profile 126 corresponding to a consumer 106A that may be stored in the database 124, cloud storage system, or other data repository.

Additionally, the data collection module 116 may access, receive, and/or determine data associated with user information and/or user actions associated with the reward programs, as described above. In some examples, the data collection module 116 may receive and/or access such information from the merchants 106B associated with the reward programs. In other examples, the data collection module 116 may receive and/or access such information from third-party service providers managing the reward programs on behalf of the merchants 106B associated with the reward programs. In yet additional and/or alternative examples, the data collection module 116 may be granted access to consumer accounts associated with the reward programs. The data corresponding to the user information and/or user actions associated with reward programs may be mapped to, or otherwise associated with, a user profile 126 corresponding to a consumer 106A that may be stored in the database 124, cloud storage system, or other data repository.

Block 204 illustrates receiving a search query. In at least one example, the search result generation module 118 may receive a search query for an item from a device 108A. In some examples, the device 108A may correspond to a consumer 106A. In other examples, the device 108A may correspond to someone other than the consumer 106A who may be planning travel or otherwise acquiring items on behalf of the consumer 106A. In such examples, the search result generation module 118 may determine that the search query is associated with the consumer 106A based at least in part on identifying an account (e.g., retail purchase account, rewards program account, etc.) associated with the search query or based at least in part on the consumer 106A otherwise identifying him or herself. A consumer 106A, or someone acting on behalf of the consumer, may input a word or set of words related to an item into a search bar of a search engine associated with the service provider 102.

Block 206 illustrates accessing and/or receiving search results corresponding to the search query. The search result generation module 118 may leverage search algorithms to access, receive, and/or determine generic search results. That is, responsive to receiving a search query, the search result generation module 118 may access, receive, and/or generate search results that are universally applicable to all consumers 106A searching for a same item. The individual search results in the search engine results page may be associated with multiple merchants 106A and/or service provider 102. As described above, a search result may represent a listing by a merchant 106B and/or service provider 102 that is offering an item (e.g., product, service, etc.) for acquisition. Each listing may be associated with data (i.e., listing data) indicating information about a corresponding item and/or data indicating terms for acquiring the item, as described above.

Block 208 illustrates accessing reward program data associated with the user (e.g., consumer 106A). The data corresponding to the user information and/or user actions associated with reward programs may be mapped to, or otherwise associated with, a user profile 126 corresponding to a consumer 106A that may be stored in the database 124, cloud storage system, or other data repository. The search result generation module 118 may access the reward program data associated with a user profile 126 corresponding to the consumer 106A to determine rewards that are available from various reward programs. That is, reward program data may identify rewards that are available from reward programs. Each reward may be associated with data (i.e., reward data). The data may indicate terms for redeeming the reward, as described above.

Block 210 illustrates determining that a reward is redeemable for a listing corresponding to a search result. In at least one example, the search result generation module 118 may access each search result returned responsive to the search query and may compare the listing data with reward data. Based at least in part on determining a match between at least a portion of the listing data and a portion of the reward data, the search result generation module 118 may determine that the reward is redeemable for the listing.

Block 212 illustrates generating personalized search results. Based at least in part on determining that a reward is redeemable for a listing, the search result generation module 118 may generate a personalized search result. In some examples, the search result generation module 118 may annotate each search result with information relevant to a reward that is redeemable for the corresponding search result. An example of a personalized search engine results page with annotations corresponding to redeemable rewards is illustrated in FIG. 6B and described below. In additional and/or alternative examples, the search result generation module 118 may modify a cost presented in association with a search result based at least in part on determining a redeemable reward for the corresponding listing, thereby generating personalized search results. The modified cost may reflect the cost of the item associated with the search result after redeemable rewards are redeemed. An example of a personalized search engine results page wherein costs of individual search results are modified to reflect redemption of redeemable rewards is illustrated in FIG. 6C and described below. As described above, in some examples, the personalization module 120 may cause a graphical indicator to be presented in association with a search result that maximizes the benefit to the consumer 106A. The search result generation module 118 may personalize search results in other ways as described herein.

In some examples, the search results may be ranked based at least in part on cost, rating, proximity to a predetermined geographic location, etc. In additional and/or alternative examples, the search result generation module 118 may rank the personalized search results based at least in part on a value score, described above. The search results may appear in a position corresponding to a ranking in a personalized search engine results page.

Block 214 illustrates generating a user interface for presenting the search results to the user (e.g., consumer 106A). The presentation module 122 may generate user interfaces and cause the user interfaces to be presented to consumers 106A via displays on corresponding devices 108A. In alternative examples, modules other than the presentation module 122 may generate the user interfaces and/or content to be included in the user interfaces and the presentation module 122 may cause the user interfaces to be presented via displays of devices 108A. Based at least in part on personalizing individual search results, the search result generation module 118 and/or the presentation module 122 may generate a personalized search engine results page, as illustrated in FIGS. 6B and 6C below.

Block 216 illustrates causing the user interface to be presented to the user (e.g., consumer 106A) via a device 108A corresponding to the user (e.g., consumer 106A). The presentation module 122 may cause user interfaces configured to present personalized search engine results pages to be presented to consumers 106A, as illustrated in FIGS. 6B and 6C. The presentation module 122 may cause the user interfaces to be presented to the consumer via a website, text message, an email, a push notification, etc. The presentation module 122 may cause user interfaces to be presented to consumers 106A responsive to receiving search queries. As described above, in additional and/or alternative examples, the user interface may be presented to a user other than the consumer 106A, such as, when the user other than the consumer 106A is acting on behalf of the consumer 106A.

Figure 3:
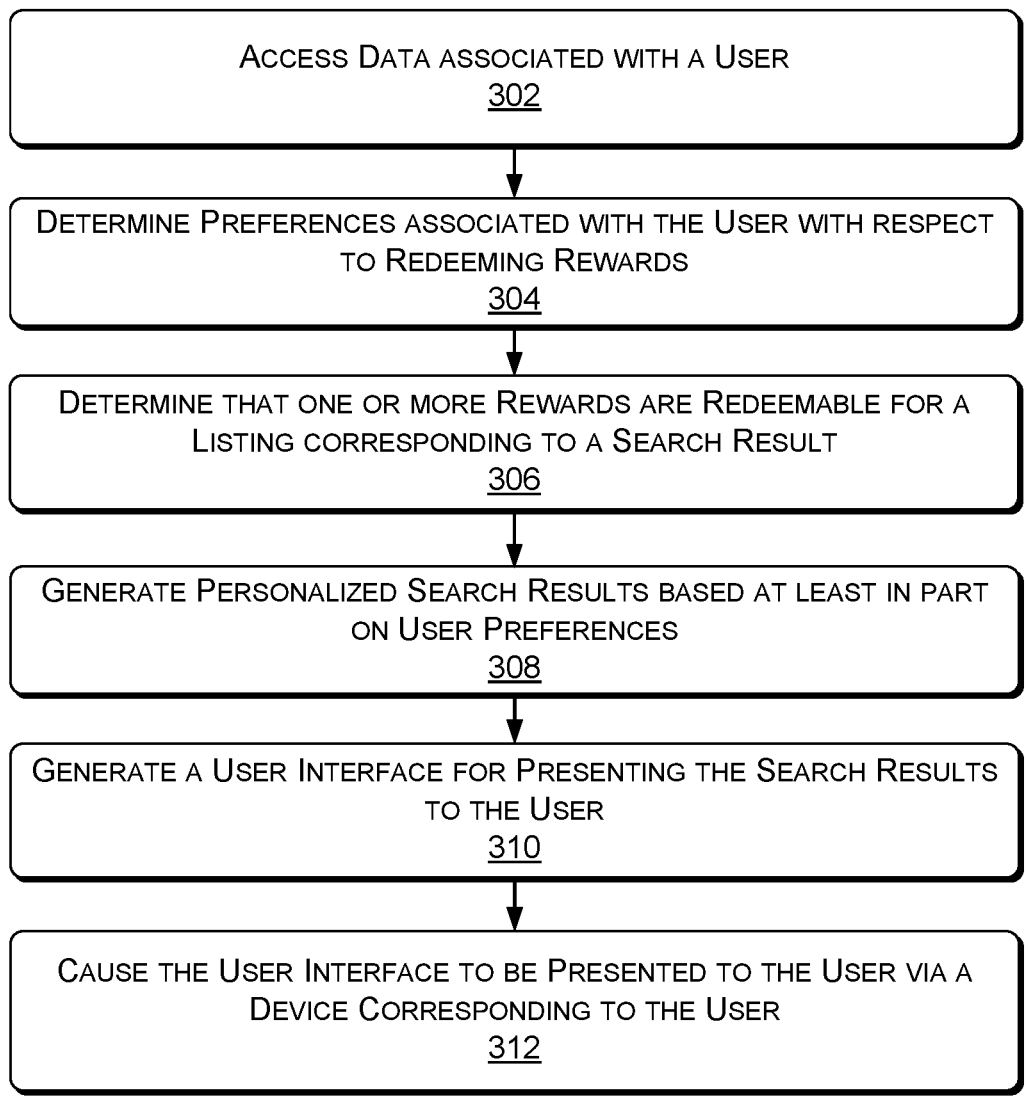
FIG. 3 is a flow diagram showing an illustrative process to generate personalized search engine results pages based on learned preferences associated with a user (e.g., consumer).

FIG. 3 is a flow diagram showing an illustrative process 300 to generate personalized search engine results pages based on learned preferences associated with users (e.g., consumers 106A).

Block 302 illustrates accessing data associated with a user (e.g., consumer 106A). As described above, the data collection module 116 may access, receive, and/or determine data associated with user information and/or user actions associated with the reward programs, retail purchase accounts, third-party sources and systems, etc. The data corresponding to the user information and/or user actions may be mapped to, or otherwise associated with, a user profile 126 corresponding to a consumer 106A that may be stored in the database 124, cloud storage system, or other data repository.

Block 304 illustrates determining preferences associated with the user (e.g., consumer 106A) with respect to redeeming rewards. The personalization module 120 may determine consumer preferences and may leverage the preferences to personalize search results associated with the search engine results page. In at least one example, the personalization module 120 may utilize machine learning algorithms to determine preferences of the consumers 106A, as described above. The machine learning algorithms may access data associated with consumers 106A such as, data associated reward program membership information, user information and/or user actions associated with reward programs, user information and/or user actions associated with a retail purchase account, user information and/or user actions associated with third-party sources and systems, etc. The machine learning algorithms may identify consumer preferences with respect to how individual consumers 106A prefer to redeem rewards, as described above. Data corresponding to such preferences may be stored in the database 124, mapped to, or otherwise associated with, respective user profiles 126.

Block 306 illustrates determining that one or more rewards are redeemable for a listing corresponding to a search result. As described above, the data corresponding to the user information and/or user actions associated with reward programs may be mapped to, or otherwise associated with, a user profile 126 corresponding to a consumer 106A that may be stored in the database 124, cloud storage system, or other data repository. In at least one example, the search result generation module 118 may access each search result and may compare the data associated with the corresponding listing (i.e., listing data) with data associated with rewards that are available to a consumer 106A (i.e., reward data) by virtue of the consumer's 106A membership in various reward programs. That is, reward program data may identify rewards that are available from reward programs.

Each reward may be associated with data (i.e., reward data), as described above. The search result generation module 118 may compare the listing data and the reward data to determine whether at least a portion of the listing data and at least a portion of the reward data match. Based at least in part on determining a match between at least a portion of the listing data and at least a portion of the reward data, the search result generation module 118 may determine that an available reward is redeemable for the listing.

In some examples, more than one reward may be redeemable for a listing corresponding to a search result. In at least one example, a reward program may offer more than one reward that matches a listing. Accordingly, more than one reward may be redeemable for a listing corresponding to a search result. In other examples, consumers 106A may be members of more than one reward program. Accordingly, more than one reward may be redeemable for a listing corresponding to a search result.

Block 308 illustrates generating personalized search results based at least in part on the preferences associated with the user (e.g., consumer 106A). Based at least in part on determining that a reward is redeemable for a listing, the search result generation module 118 may generate a personalized search result. In some examples, the search result generation module 118 may annotate each search result with information relevant to a reward that is redeemable for the corresponding search result. An example of a personalized search engine results page with annotations corresponding to redeemable rewards is illustrated in FIG. 6B and described below. In additional and/or alternative examples, the search result generation module 118 may modify a cost presented in association with a search result based at least in part on determining a redeemable reward for the corresponding listing, thereby generating personalized search results. The modified cost may reflect the cost of the item associated with the search result after redeemable rewards are redeemed. An example of a personalized search engine results page wherein costs of individual search results are modified to reflect redemption of redeemable rewards is illustrated in FIG. 6C and described below. As described above, in some examples, the personalization module 120 may cause a graphical indicator to be presented in association with a search result that maximizes the benefit to the consumer 106A. The search result generation module 118 may personalize search results in other ways as described herein.

As described above, the personalization module 120 may determine preferences associated with the consumer 106A and may leverage the preferences to personalize the search results associated with the search engine results page. The personalization module 120 may leverage the machine learning algorithms to personalize search results in a search engine results page based at least in part on determined preferences of the consumers 106A. For instance, as described above, as a result of a consumer 106A belonging to multiple reward programs, one or more rewards may be redeemable for a listing corresponding to a search result. In such examples, the search result generation module 118 may annotate the search result indicating one or more of the redeemable rewards.

In at least one example, the number of redeemable rewards may exceed space on the user interface allocated for a search result. In some examples, the search result generation module 118 may prioritize which rewards are presented to the consumer 106A and/or the order in which the rewards are presented to the consumer 106A based at least in part on determined preferences of the consumer 106A. That is, the personalization module 120 may determine that one or more rewards are likely to be the most desirable to the consumer 106A and accordingly, the search result generation module 118 may cause the one or more rewards that are likely to be the most desirable to the consumer 106A to be presented to the consumer 106A prior to rewards that are less desirable to the consumer 106A. For instance, the one or more rewards that are likely to be the most desirable to the consumer 106A may be ranked at the top of a list of rewards that are redeemable for a listing and other rewards may be ranked based on how desirable the personalization module 120 determines the rewards to be. That is, if two rewards are redeemable for a listing, the reward that is likely to be the most desirable to the consumer 106A may be ranked first and the other reward may be ranked second. The search result generation module 118 may annotate the presentation of the corresponding search result based on the ranking order between the rewards.

In other examples, the personalization module 120 may modify the cost presented with a search result based at least in part on determined preferences of the consumer 106A. That is, the personalization module 120 may determine that one or more rewards are likely to be the most desirable to the consumer 106A and accordingly, may modify the cost associated with the search result to reflect a new cost determined based at least in part on redemption of the one or more rewards that are likely to be the most desirable to the consumer 106A. For instance, the one or more rewards that are likely to be the most desirable to the consumer 106A may be ranked at the top of a list of rewards redeemable for a listing and other rewards may be ranked based on how desirable the personalization module 120 determines the rewards to be. That is, if two rewards are redeemable for a listing, the reward that is likely to be the most desirable to the consumer 106A may be ranked first and the other reward may be ranked second. The search result generation module 118 may modify the cost of the item corresponding to a listing based on the ranking order between the rewards. That is, the search result generation module 118 may modify the cost of the item to reflect redemption of the top ranked reward.

The search result generation module 118 may annotate the search result with additional and/or alternative rewards or may cause the additional and/or alternative rewards to be presented on an item detail page, as described above.

In some examples, the personalization module 120 may access the data corresponding to the user preferences stored in the database 124 to determine consumers' preferences with respect to how they redeem rewards that are available to and redeemable by them and may manage reward programs and resulting rewards to determine how to maximize a benefit to the consumers 106A consistent with their preferences. For instance, the personalization module 120 may evaluate each of the personalized search results and identify one or more personalized search results that maximize the benefit to the consumer 106A consistent with the consumer preferences, as described above. In at least one example, the personalization module 120 may cause a graphical indicator to be presented in association with a search result that maximizes the benefit to the consumer 106A consistent with the user preferences to inform the consumer 106A that a particular search result is best for maximizing the rewards for the consumer 106A consistent with the user preferences. A non-limiting example of a graphical indicator is illustrated in FIG. 6B.

In additional and/or alternative examples, the personalization module 120 may evaluate the rewards that are redeemable for a listing corresponding to a search result and may determine a value score associated with the search result, as described above. In some examples, the value score may represent a cash equivalency value of redeeming each reward that is redeemable for a listing. In other examples, the value score may be representative of a cash equivalency value in view of learned preferences of the consumer 106A, as described above.

In some examples, the search results may be ranked based at least in part on cost, rating, proximity to a predetermined geographic location, etc. In additional and/or alternative examples, the search result generation module 118 may rank the personalized search results based at least in part on a value score, described above. The search results may appear in a position corresponding to a ranking in a personalized search engine results page.

Block 310 illustrates generating a user interface for presenting the search results to the user (e.g., consumer 106A). The presentation module 122 may generate user interfaces and cause the user interfaces to be presented to consumers 106A via displays on corresponding devices 108A. In alternative examples, modules other than the presentation module 122 may generate the user interfaces and/or content to be included in the user interfaces and the presentation module 122 may cause the user interfaces to be presented via displays of devices 108A. Based at least in part on personalizing individual search results, the search result generation module 118 and/or the presentation module 122 may generate a personalized search engine results page, as illustrated in FIGS. 6B and 6C below.

Block 312 illustrates causing the user interface to be presented to the user (e.g., consumer 106A) via a device 108A corresponding to the user (e.g., consumer 106A). The presentation module 122 may cause user interfaces configured to present personalized search engine results pages to be presented to consumers 106A, as illustrated in FIGS. 6B and 6C. The presentation module 122 may cause the user interfaces to be presented to the consumer via a website, text message, an email, a push notification, etc. The presentation module 122 may cause user interfaces to be presented to consumers 106A responsive to receiving search queries. As described above, in additional and/or alternative examples, the user interface may be presented to a user other than the consumer 106A, such as, when the user other than the consumer 106A is acting on behalf of the consumer 106A.

Figure 4:
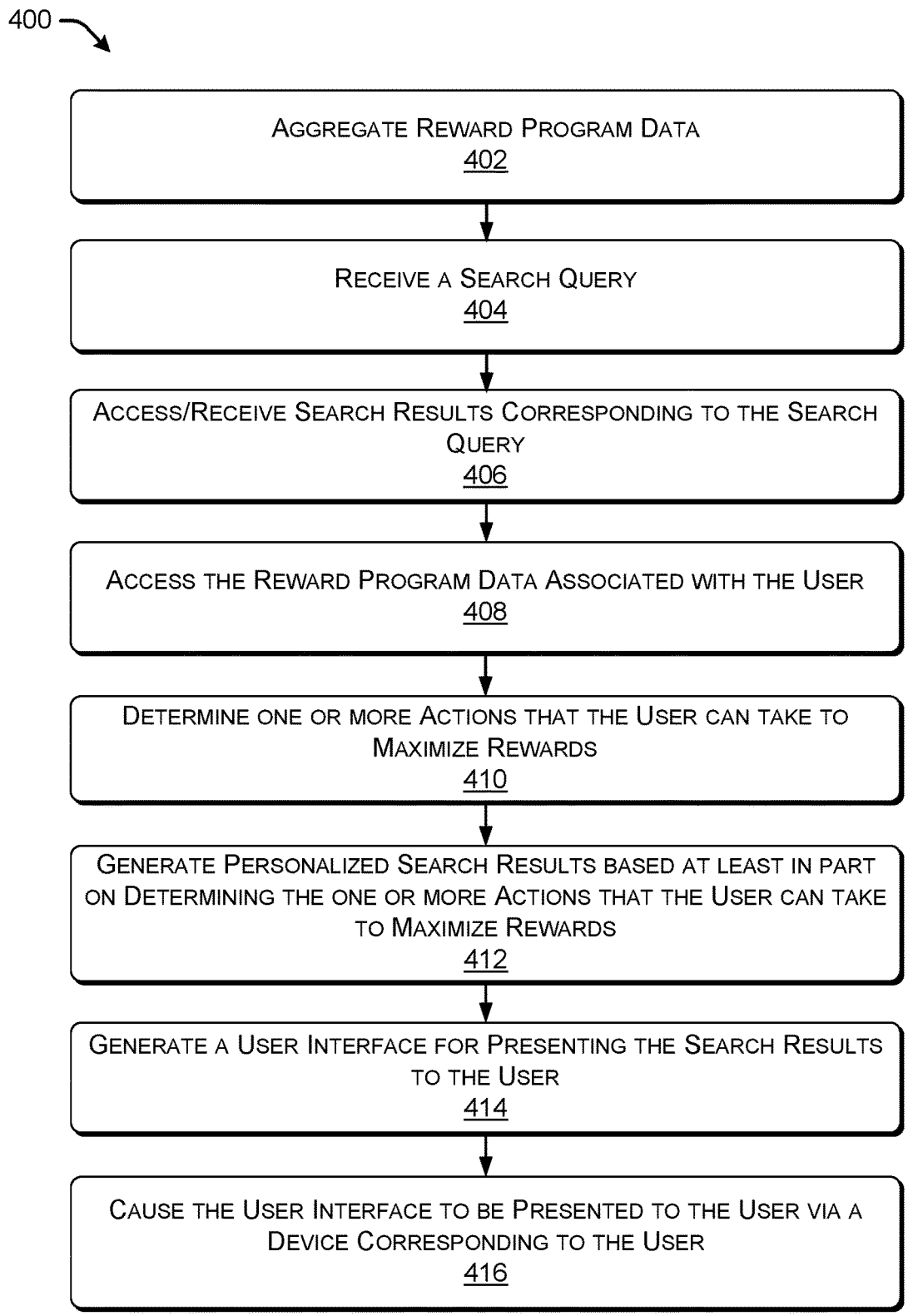
FIG. 4 is a flow diagram showing an illustrative process to generate personalized search engine results pages based at least in part on determining one or more actions that a user (e.g., a consumer) can take to maximize rewards.

FIG. 4 is a flow diagram showing an illustrative process 400 to generate personalized search engine results pages based at least in part on determining one or more actions that a user (e.g., a consumer 106A) can take to maximize rewards.

Block 402 illustrates aggregating reward program data. In addition to accessing, receiving, and/or determining data associated with user information and/or user actions, in at least one example, the data collection module 116 may access, receive, and/or determine data associated with the reward programs. In some examples, the data collection module 116 may develop relationships with merchants 106B associated with the reward programs and/or third-party service providers managing the reward programs on behalf of the merchants 106B to access and/or receive information about respective reward programs. For instance, the merchants 106B and/or third-party service providers may provide terms and conditions associated with respective reward programs, rewards that are available via respective reward programs, terms associated with individual rewards, statuses/membership levels that are available via respective reward programs, etc. The data corresponding to various reward programs may be mapped to, or otherwise associated with, respective reward program profiles 128 that may be stored in the database 124, cloud storage system, or other data repository.

Block 404 illustrates receiving a search query. In at least one example, the search result generation module 118 may receive a search query for an item from a device 108A. In some examples, the device 108A may correspond to a consumer 106A. In other examples, the device 108A may correspond to someone other than the consumer 106A who may be planning travel or otherwise acquiring items on behalf of the consumer 106A. In such examples, the search result generation module 118 may determine that the search query is associated with the consumer 106A based at least in part on identifying an account (e.g., retail purchase account, rewards program account, etc.) associated with the search query or based at least in part on the consumer 106A otherwise identifying him or herself. A consumer 106A, or someone acting on behalf of the consumer, may input a word or set of words related to an item into a search bar of a search engine associated with the service provider 102.

Block 406 illustrates accessing and/or receiving search results corresponding to the search query. The search result generation module 118 may leverage search algorithms to access, receive, and/or determine generic search results. That is, responsive to receiving a search query, the search result generation module 118 may access, receive, and/or generate search results that are universally applicable to all consumers 106A searching for a same item. The individual search results in the search engine results page may be associated with multiple merchants 106A and/or service providers 102. As described above, a search result may represent a listing by a merchant 106B and/or service provider 102 that is offering an item (e.g., product, service, etc.) for acquisition. Each listing may be associated with data (i.e., listing data) indicating information about a corresponding item and/or data indicating terms for acquiring the item, as described above.

Block 408 illustrates accessing reward program data associated with the user (e.g., consumer 106A). As described above, the data corresponding to the user information and/or user actions associated with reward programs may be mapped to, or otherwise associated with, a user profile 126 corresponding to a consumer 106A that may be stored in the database 124, cloud storage system, or other data repository. In at least one example, the search result generation module 118 may access each search result and may compare the data associated with the corresponding listing (i.e., listing data) with data associated rewards that are available to a consumer 106A (i.e., reward data) by virtue of the consumer's 106A membership in various reward programs. That is, reward program data may identify rewards that are available from reward programs.

Each reward may be associated with data (i.e., reward data), as described above. The search result generation module 118 may compare the listing data and the reward data to determine whether at least a portion of the listing data and at least a portion of the reward data match. Based at least in part on determining a match between at least a portion of the listing data and at least a portion of the reward data, the search result generation module 118 may determine that an available reward is redeemable for the listing.

Block 410 illustrates determining one or more actions that the user (e.g., consumer 106A) can take to maximize rewards. In at least one example, the search result generation module 118 may access each search result and may compare the listing data to the reward data to determine whether at least a portion of the listing data and at least a portion of the reward data match. Based at least on determining a match, the search result generation module 118 may determine that an available reward is redeemable for the listing.

In other examples, the search result generation module 118 may access each search result and may compare the listing data with reward programs stored in the reward program profiles 128. That is, reward program data may identify rewards that are available from reward programs of which the consumer 106A does not belong. Based at least in part on comparing listing data with reward data and determining that at least a portion of the listing data and at least a portion of the reward data match, the search result generation module 118 may determine that a reward is available for the listing. However, the consumer 106A may not be a member of a reward program offering a reward that is available for the listing. In such examples, the personalization module 120 may provide an indication to the consumer 106A of the reward that is available and that if the consumer 106A signs up for the corresponding reward program, that the reward may be redeemable for the listing. That is, the personalization module 120 may recommend new reward programs to the consumers 106A. In some examples, the personalization module 120 may access data associated with corresponding user profiles 126 to auto-fill reward program applications for ease of the consumer 106A.

In at least one example, as described above, the personalization module 120 may access the data corresponding to the user preferences stored in the database 124 to determine consumers' preferences with respect to how they redeem rewards that are available to and redeemable by them and may manage reward programs and resulting rewards to determine how to maximize a benefit to the consumers 106A consistent with their preferences. For instance, the personalization module 120 may evaluate each of the personalized search results and identify one or more personalized search results that maximize the benefit to the consumer 106A consistent with the consumer preferences.

Block 412 illustrates generating personalized search results based at least in part on determining the one or more actions that the user (e.g., consumer 106A) can take to maximize rewards. Based at least in part on determining that rewards are redeemable for a listing corresponding to a search result, the search result generation module 118 may generate a personalized search result to identify the one or more actions that the consumer 106A can take to maximize rewards. In some examples, the search result generation module 118 may annotate each search result with information indicating the one or more actions that the consumer 106A can take to maximize rewards. In at least one example, the annotation may include one or more new reward programs that may enable an additional reward to be redeemable for the listing.

In additional and/or alternative examples, the search result generation module 118 may modify a cost presented in association with a search result to reflect redemption of the redeemable reward. In some examples, the search result generation module 118 may annotate search results where the cost is modified to provide additional information about the one or more actions that the consumer 106A can take to maximize rewards. In at least one example, the annotation may include one or more new reward programs that may enable an additional reward to be redeemable for the listing.

Furthermore, as described above, in some examples, the personalization module 120 may cause a graphical indicator to be presented in associated with a search result that maximizes the benefit to the consumer 106A to indicate to the consumer 106A that selection of the search result that maximizes the benefit to the consumer 106A.

Block 414 illustrates generating a user interface for presenting the search results to the user (e.g., consumer 106A). The presentation module 122 may generate user interfaces and cause the user interfaces to be presented to consumers 106A via displays on corresponding devices 108A. In alternative examples, modules other than the presentation module 122 may generate the user interfaces and/or content to be included in the user interfaces and the presentation module 122 may cause the user interfaces to be presented via displays of devices 108A. Based at least in part on personalizing individual search results, the search result generation module 118 and/or the presentation module 122 may generate a personalized search engine results page, as illustrated in FIGS. 6B and 6C below.

Block 416 illustrates causing the user interface to be presented to the user (e.g., consumer 106A) via a device 108A corresponding to the user (e.g., consumer 106A). The presentation module 122 may cause user interfaces configured to present personalized search engine results pages to be presented to consumers 106A, as illustrated in FIGS. 6B and 6C. The presentation module 122 may cause the user interfaces to be presented to the consumer via a website, text message, an email, a push notification, etc. The presentation module 122 may cause user interfaces to be presented to consumers 106A responsive to receiving search queries. As described above, in additional and/or alternative examples, the user interface may be presented to a user other than the consumer 106A, such as, when the user other than the consumer 106A is acting on behalf of the consumer 106A.

Figure 5:
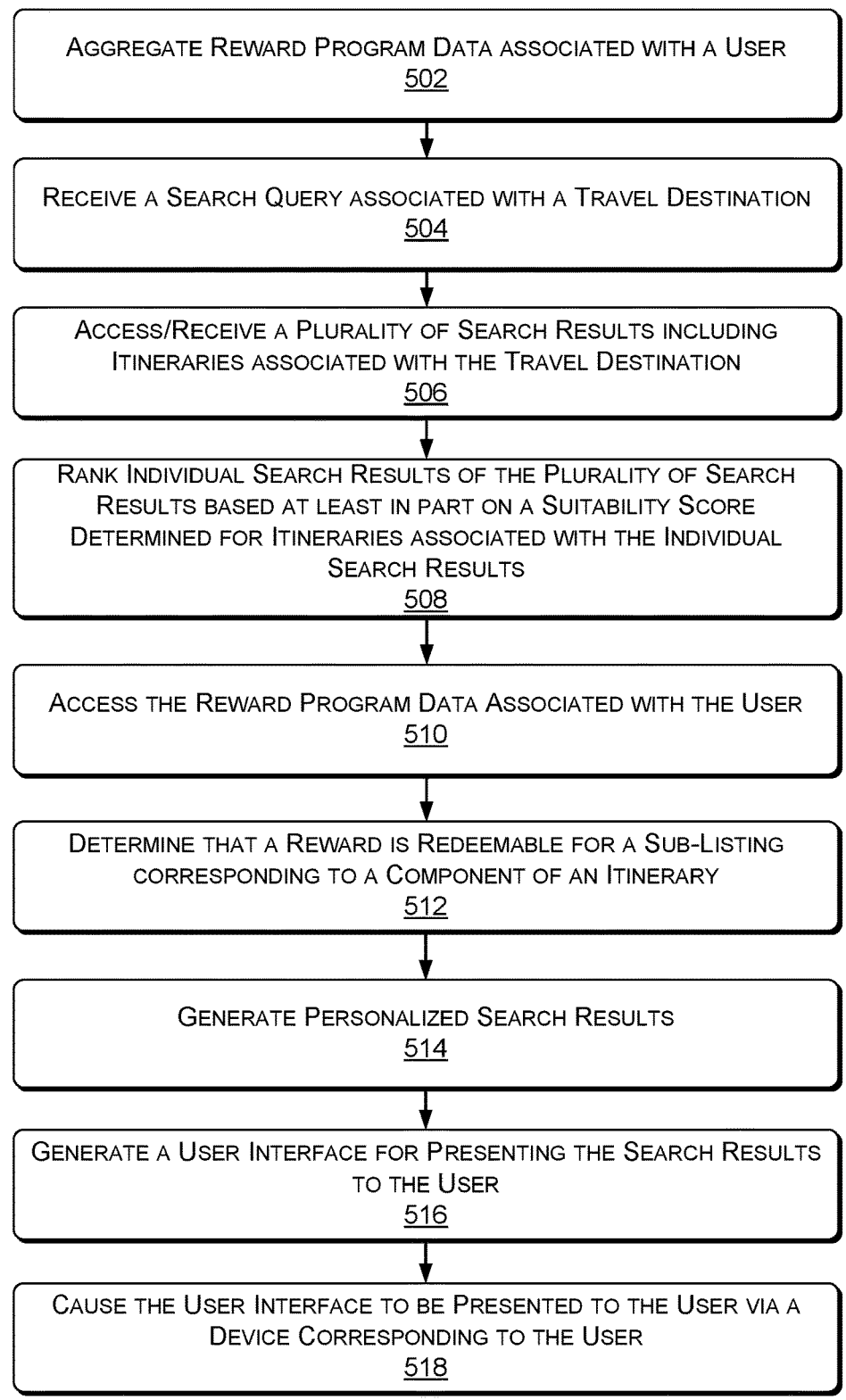
FIG. 5 is a flow diagram showing an illustrative process to generate personalized search engine results pages of search results corresponding to itineraries based at least in part on reward program data and/or preferences associated with a user (e.g., consumer).

FIG. 5 is a flow diagram showing an illustrative process 500 to generate personalized search engine results pages of search results corresponding to itineraries 130 based at least in part on reward program data and/or preferences associated with a user (e.g., consumer 106).

Block 502 illustrates aggregating reward program data associated with a user (e.g., consumer 106A). As described above, the data collection module 116 may access, receive, and/or determine data associated with user information and/or user actions associated with the reward programs, retail purchase accounts, third-party sources and systems, etc. The data corresponding to the user information and/or user actions may be mapped to, or otherwise associated with, a user profile 126 corresponding to a consumer 106A that may be stored in the database 124, cloud storage system, or other data repository.

Block 504 illustrates receiving a search query associated with a travel destination. In at least one example, the search result generation module 118 may receive a search query for an item from a device 108A. In some examples, the device 108A may correspond to a consumer 106A. In other examples, the device 108A may correspond to someone other than the consumer 106A who may be planning travel or otherwise acquiring items on behalf of the consumer 106A. In such examples, the search result generation module 118 may determine that the search query is associated with the consumer 106A based at least in part on identifying an account (e.g., retail purchase account, rewards program account, etc.) associated with the search query or based at least in part on the consumer 106A otherwise identifying him or herself.

A consumer 106A, or someone acting on behalf of the consumer, may input a word or set of words related to an item into a search bar of a search engine associated with the service provider 102. In some examples, the search query may be associated with a travel destination. In at least one example, the search query may expressly identify the travel destination. For instance, a search query may be "hotels in Seattle, Wash.," and the data collection module 116 may determine that the travel destination is Seattle, Wash. In other examples, a search query may be generated on behalf of the consumer 106A based at least in part on implying a travel destination.

For instance, in some examples, the data collection module 116 may imply a travel destination of a consumer 106A based at least in part on user information and/or user actions, described above. In some examples, a consumer 106A may make reservations for accommodations in a particular destination, purchase an inbound and outbound plane ticket associated with the particular destination, etc. Based at least in part on determining the particular destination associated with the reservation, plane ticket, etc., the data collection module 116 may determine that the particular destination is a travel destination of a consumer 106A. In addition to determining the travel destination, the data collection module 116 may determine a date associated with the travel, a length of a stay associated with the travel, a season associated with the travel, a number of individuals travelling, etc. In some examples, the data collection module 116 may determine such information from a reservation for accommodations, plane tickets, etc. In additional and/or alternative examples, the data collection module 116 may determine such information from user information and/or user actions associated with a user profile 134.

Block 506 illustrates accessing and/or receiving a plurality of search requests including itineraries 130 associated with the travel destination. Based at least in part on receiving the search query associated with the travel destination, the search result generation module 118 may access, receive, and/or determine a plurality of search results. Each search result may correspond to a listing associated with an individual itinerary 130 of the plurality of itineraries 130. As described above, the database 124 may include one or more itineraries 130. In at least one example, the database 124 may include a plurality of itineraries 130 that may be organized by destination. The search result determination module 118 may access a plurality of itineraries 130 that are mapped to, or otherwise associated with, the travel destination associated with the search query and return individual itineraries 130 as search results.

An itinerary 130 may include various components associated with accommodations associated with a travel destination, one or more attractions associated with a travel destination, transportation to, from, and around a travel destination, etc. For the purpose of this discussion, an attraction may be a place to visit at or near the travel destination such as a restaurant, a national park, a theme park, a landmark, a tour, a resort, etc., an activity to do at or near the travel destination such as a sightseeing activity, a sporting event, a concert, etc. An itinerary 130 may also include a route that may include an order for traveling to each of the one or more attractions, an amount of time to spend at each of the one or more attractions, etc., as described above. The route may be associated with transportation information.

A search result may correspond to a listing of an itinerary 130, as described above. Each component associated with an itinerary 130 may be associated with a sub-listing. In at least one example, each component of an itinerary 130 may be associated with a different merchant 106B and/or service provider 102. In other examples, all of the components of an itinerary 130 may be associated with a same merchant 106B and/or service provider 102. In some examples, each component may be associated with a cost for acquiring the component (e.g., staying at the accommodation, participating/visiting the attraction, etc.). Each component may have data associated with the component (i.e., sub-listing data) indicating information about a corresponding component and/or data indicating terms for acquiring the component. For instance, non-limiting examples of data associated with the component may include data indicating a merchant 106B offering the component, component details, ratings/reviews, etc. For a hotel room, for example, the component details may include the number of guests in the party, the size of beds requested (e.g., queen, king, etc.), a type of room requested (e.g., standard, premium, suite, etc.), etc. For a sporting event, for example, the item details may a seat, a date, a time, parties involved, venue hosting, etc. Non-limiting examples of data indicating terms for acquiring the component may include a cost of the component, restrictions and/or limitations on reward redemption, blackout dates, etc.

Block 508 illustrates ranking individual search results of the plurality of search results based at least in part on a suitability score determined for itineraries 130 associated with the individual search results. A suitability score may indicate a likelihood that a particular itinerary may be of interested to a consumer 106A. As described above, the data collection module 116 may access and/or receive user information and/or user actions associated with a retail purchase account associated with a consumer 106A, user information and user actions associated with third party sources and systems, etc. that may be mapped to, or otherwise associated with, the user profile 126 corresponding to the consumer 106A in the database 124, as described above. In some examples, the data collection module 116 may leverage the data to determine trends and/or preferences associated with the consumer 106A for gaining insight with respect to which itineraries 130 are most suitable for the consumer 106A. For instance, the data collection module 116 may leverage the data associated with user information and/or user actions to determine trends and/or preferences such as, how many individuals are travelling, ages of the travelers, subscriptions and/or memberships associated with the consumer 106A, vacationing style (e.g., relaxation or on-the-go, outdoor activities or inside activities, luxurious or budget, etc.), etc. The user information and user actions may enable the data collection module 116 to determine an itinerary 130 that is most suitable for a particular consumer 106A.

In some examples, the data collection module 116 may utilize machine learning algorithms to determine the suitability scores corresponding to individual itineraries 130 each corresponding to a search result. The machine learning algorithms may include supervised learning algorithms (e.g., artificial neural networks, Bayesian statistics or networks, Gaussian process regression, logistic model trees, support vector machines, etc.), unsupervised learning algorithms (e.g., artificial neural networks, association rule learning, hierarchical clustering, cluster analysis, etc.), deep learning algorithms, etc. The machine learning algorithms may determine a suitability score for each itinerary 130 based at least in part on accessing data associated with the intended destination, the date associated with the travel, the season associated with the travel, the duration of the travel, the number of people travelling together, the consumer's interests and/or preferences, etc.

The machine learning algorithms may access and/or receive user information and/or user actions associated with a retail purchase account associated with a consumer 106A, user information and/or user actions associated with third party sources and systems, etc. and data associated with the travel destination may evaluate individual itineraries 130 in view of the user information and user actions. For instance, the data collection module 116 may access individual itineraries 130 from the database 124 and may compare the one or more accommodations, attractions, transportation options, and/or routes in the itineraries 130 with the interests and/or preferences of the consumer 106A (as determined by the user information and/or user actions). In additional and/or alternative examples, the data collection module 116 may leverage the date associated with the travel, the season associated with the travel, the duration of the travel, the number of people travelling together, etc. to determine the suitability score for a particular itinerary 130. A suitability score above a predetermined threshold or within a range of suitability scores may indicate that the corresponding candidate itinerary is likely to be of interested to the consumer 106A. A suitability score below a predetermined threshold or outside of the range of suitability scores may indicate that the corresponding candidate itinerary is not likely to be of interest to the consumer 106A.

In some examples, the search result generation module 118 may leverage the suitability scores to rank the search results in the personalized search engine results page. In such examples, search results corresponding to itineraries 130 with highest suitability scores may be at a top of a ranking order and search results corresponding to itineraries 130 with lowest suitability scores may be at a bottom of a ranking order.

Block 510 illustrates accessing reward program data associated with the user (e.g., consumer 106A). The data corresponding to the user information and/or user actions associated with reward programs may be mapped to, or otherwise associated with, a user profile 126 corresponding to a consumer 106A that may be stored in the database 124, cloud storage system, or other data repository. The search result generation module 118 may access the reward program data associated with a user profile 126 corresponding to the consumer 106A. The search result generation module 118 may access the reward program data associated with a user profile 126 corresponding to the consumer 106A to determine rewards that are available from various reward programs. That is, reward program data may identify rewards that are available from reward programs. Each reward may be associated with data (i.e., reward data). The data may indicate terms for redeeming the reward, as described above.

Block 512 illustrates determining that a reward is redeemable for a sub-listing corresponding to a component of an itinerary. In at least one example, the search result generation module 118 may access each component of each itinerary returned responsive to the search query and may compare the data associated with the sub-listing corresponding to the component with data associated with rewards that are available via different reward programs associated with the consumer 106A. Based at least in part on comparing data associated with the sub-listing with reward data and determining that at least a portion of the data associated with the sub-listing and a portion of the reward data match, the search result generation module 118 may determine that the reward is redeemable for the sub-listing.

Block 514 illustrates generating personalized search results. Based at least in part on determining that a reward is redeemable for a sub-listing, the search result generation module 118 may generate a personalized search result to reflect that a reward is redeemable. In some examples, the search result generation module 118 may annotate each component of an itinerary with information relevant to a reward that is redeemable by the consumer 106A by virtue of his or her membership in a corresponding reward program.

In additional and/or alternative examples, the search result generation module 118 may modify a cost presented in association with a search result to reflect redemption of the redeemable reward. In at least one example, the search result generation module 118 may modify a cost of a component of an itinerary 130 to reflect redemption of the redeemable reward. As a result, the search result generation module 118 may modify a cost presented in association with an itinerary 130. In other examples, the search result generation module 118 may modify a cost presented in association with the complete itinerary 130 and may enable a consumer 106A to determine which rewards are applicable to which components. As described above, in some examples, the personalization module 120 may cause a graphical indicator to be presented in association with a search result that maximizes the benefit to the consumer 106A. The search result generation module 118 may personalize search results in other ways as described herein.

In some examples, the personalization module 120 may determine a value score for each component of an itinerary 130 and a value score for the complete itinerary 130.

Block 516 illustrates generating a user interface for presenting the search results to the user (e.g., consumer 106A). The presentation module 122 may generate user interfaces and cause the user interfaces to be presented to consumers 106A via displays on corresponding devices 108A. In alternative examples, modules other than the presentation module 122 may generate the user interfaces and/or content to be included in the user interfaces and the presentation module 122 may cause the user interfaces to be presented via displays of devices 108A. Based at least in part on personalizing individual search results, the search result generation module 118 and/or the presentation module 122 may generate a personalized search engine results page.

Block 518 illustrates causing the user interface to be presented to the user (e.g., consumer 106A) via a device 108A corresponding to the user (e.g., consumer 106A). The presentation module 122 may cause user interfaces configured to present personalized search engine results pages to be presented to consumers 106A, as illustrated in FIGS. 6B and 6C. The presentation module 122 may cause the user interfaces to be presented to the consumer 106A via a website, text message, an email, a push notification, etc. The presentation module 122 may cause user interfaces to be presented to consumers 106A responsive to receiving search queries. As described above, in additional and/or alternative examples, the user interface may be presented to a user other than the consumer 106A, such as, when the user other than the consumer 106A is acting on behalf of the consumer 106A.

FIG. 6A is a diagram showing an example user interface that may be presented via a display 600 of a device (e.g., device 108A) that is configured to present a search engine results page 602. As described above, in at least one example, the search result generation module 118 may receive a search query for an item. A consumer 106A, or someone acting on behalf of the consumer 106A, may input a word or set of words related to an item into a search bar 604 of a search engine associated with the service provider 102. In FIG. 6A, the consumer 106A has entered "hotel" and "Seattle, Wash." into the search bar 604. In some examples, the consumer 106A can utilize one or more filters 606 to refine the search results. In FIG. 6A, the filter 606 is shown as a date corresponding to a hotel reservation. In the hotel context, various other filters 606 may be used such as rating, proximity to a predetermined location, etc. In other contexts, alternative filters 606 may be utilized.

The search result generation module 118 may leverage search algorithms to access, receive, and/or determine generic search results 608. That is, responsive to receiving a search query, the search result generation module 118 may access, receive, and/or generate search results that are universally applicable to all consumers 106A searching for a same item. In FIG. 6A, the search returned n number of search results, 610A, 610B, 610C, 610D, 610N. Each search result 610A, 610B, 610C, 610D, and 610N corresponds to a listing for the item (e.g., a hotel room in Seattle, Wash.). In alternative examples, the item may be an itinerary 130. Control 612 may correspond to a mechanism that enables the consumer 106A to acquire the item corresponding to each search result 610A, 610B, 610C, 610D, or 610N.

The search result generation module 118 may access the reward program data associated with a user profile 126 corresponding to the consumer 106A and may personalize individual search results, 610A, 610B, 610C, 610D, and/or 610N based at least in part on the reward program data, thereby generating personalized search engine results pages. FIG. 6B is a diagram showing an example user interface that may be presented via a display 602 of a device 108A associated with a consumer 106A that is configured to present a personalized search engine results page 614.

As illustrated in FIG. 6B, in some examples, the search result generation module 118 may annotate each search result 610A, 610B, 610C, 610D, and/or 610N with information relevant to a redeemable reward, if applicable. As illustrated in FIG. 6B, the search result generation module 118 annotated search result 610B with "free wife," search result 610C with "get a queen for $200 and upgrade to king bed, 10000 bonus points, free car service," and search result 610D with "use 3,000 STARWOOD® points and pay $185." The listing of personalized search results may represent a non-limiting example of personalized search results 616.

As described above, in some examples, the personalization module 120 may access the data corresponding to the user preferences stored in the database 124 to determine consumers' preferences with respect to how they redeem rewards and may manage reward programs and resulting rewards to determine how to maximize a benefit to the consumers 106A consistent with their preferences. For instance, the personalization module 120 may evaluate each of the search results in the personalized search results 616 and may identify one or more personalized search results 610A, 610B, 610C, and/or 610D that maximize the benefit to the consumer 106A consistent with the consumer preferences. In some examples, the value score may be utilized to identify one or more personalized search results 610A, 610B, 610C, and/or 610D that maximize value to the consumer 106A consistent with the consumer preferences. In at least one example, the personalization module 120 may cause a graphical indicator 618 to be presented in association with a search result (e.g., search result 610D) that maximizes the benefit to the consumer 106A consistent with the user preferences to inform the consumer 106A that a particular search result is best for maximizing the benefit to the consumer 106A consistent with the user preferences. Graphical indicator 618 is a non-limiting example of a graphical indicator. Additional and/or alternative indicators may be used.

In additional and/or alternative examples, the search result generation module 118 may modify a cost presented in association with a search result to reflect redemption of the redeemable reward, thereby generating personalized search results. FIG. 6C is a diagram showing an example user interface that may be presented via a display 602 of a device 108A associated with a user 106A that is configured to present a personalized search engine results page 620. As illustrated in FIG. 6C, the search result generation module 118 modified the cost associated with search result 610D to reflect the cost associated with redeeming 3,000 points. Similarly, the search result generation module 118 modified the cost associated with search result 610C to reflect the cost that associated with reserving a queen bed (and then redeeming the free upgrade for the king bed). The listing of personalized search results may represent a non-limiting example of personalized search results 622.

In some examples, the generic search results may be ranked based at least in part on cost, rating, proximity to a predetermined geographic location, etc. In FIG. 6A, the search results 610A, 610B, 610C, 610D, and/or 610N are ranked by based on cost. That is, the least expensive hotel (the BEST WESTERN®) is ranked on the top and is shown first and the most expensive hotel (the W HOTEL® Seattle) is ranked on the bottom and is shown last. The search result generation module 118 may rank the personalized search results based at least in part on cost, rating, proximity to a predetermined geographic location, etc. In additional and/or alternative examples, the search result generation module 118 may rank the personalized search results based at least in part on a value score, described below. The search results may appear in a position corresponding to a ranking in a personalized search engine results page.

As illustrated in FIG. 6C, the search result generation module 118 ranked the search results 610A, 610B, 610C, and 610D based at least in part on the cost associated with the listing as a result of redeemable rewards. As illustrated, the search result 610A that is associated with a lowest cost after rewards are considered is listed first and the search result 610B that is associated with a highest cost after rewards are considered may be listed last. As a result of the personalizing search results based on rewards that are redeemable by the consumer 106A, search result 610B is now one of the more expensive options and search result 610D is one of the least expensive options. In additional and/or alternative examples, the search result generation module 118 may rank the search results 610A, 610B, 610C, and/or 610D based at least in part on corresponding value scores.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A service provider system comprising:
one or more processors; and
a memory that stores one or more computer-executable instructions that are executable by the one or more processors to cause the system to perform operations comprising:
aggregating reward program data associated with a user, the reward program data including first data corresponding to rewards available from a plurality of reward programs;
mapping, in a database, the reward program data to a profile associated with the user;
executing a machine learning algorithm on second data corresponding to interactions of the user with the plurality of reward programs, the machine learning algorithm being configured to identify from the second data preferences of the user to accumulate or redeem the rewards;
receiving a search query from a device associated with the user, the search query requesting information associated with a travel destination;
accessing a plurality of search results associated with the search query, a search result of the plurality of search results identifying a listing for an itinerary, the listing being identical for users that submitted search queries associated with the travel destination, and the itinerary including an accommodation at the travel destination, one or more attractions associated with the travel destination, and transportation to and from the travel destination;
determining, based at least in part on the reward program data, that one or more rewards of the rewards are redeemable for the itinerary, the one or more rewards including:
a first reward associated with the accommodation from a first merchant;
a second reward associated with at least one attraction of the one or more attractions from a second merchant; or
a third reward associated with the transportation to and from the travel destination from a third merchant;
generating a personalized search result based at least in part on the preferences of the user identified from execution of the machine learning algorithm by at least one of:
annotating a presentation of the search result to indicate that at least one of the first reward, the second reward, or the third reward are redeemable for the listing; or
adjusting at least one of a first cost associated with the accommodation, a second cost associated with the one or more attractions, or a third cost associated with the transportation to and from the travel destination to reflect a redemption of the first reward, the second reward, or the third reward;
generating a personalized search engine results page according to the preferences of the user identified from execution of the machine learning algorithm, the personalized search engine results page including the personalized search result;
providing for display, a user interface associated with the service provider presenting the personalized search engine results;
determining an interaction between the user and the user interface, the interaction indicating a selection of the personalized search result; and
in response to determining the interaction, redeeming at least one of the first reward, the second reward, or the third reward from at least one of the first merchant, the second merchant, or the third merchant.

2. The system of claim 1, the operations further comprising:
determining a cash equivalency value of redeeming at least one of the first reward, the second reward, or the third reward; and determining a value score associated with the search result based at least in part on the cash equivalency value.

3. The system of claim 2, the operations further comprising:
accessing third data corresponding to user actions associated with at least one of a retail purchase account associated with the user or third-party sources and systems;
identifying the preferences associated with the user based at least in part on the second data and the third data; and
determining the value score based at least in part on the preferences.

4. A computer-implemented method comprising:
performing, by a computing system, the following steps comprising:
receiving a search query from a computing device via a user interface associated with a service, the search query requesting information associated with a travel destination;
determining, from a plurality of search results associated with the search query, a search result that corresponds to a listing for an itinerary, the listing being identical for a second user that submits the search query, and the itinerary including an accommodation at the travel destination, one or more attractions associated with the travel destination, and transportation to and from the travel destination;
accessing, from one or more third-party merchant reward programs, reward program data associated with the first user, the reward program data including first data corresponding to one or more rewards that are available from the one or more third-party merchant reward programs;
determining a match between at least a portion of the first data and at least a portion of second data associated with the listing;
executing a machine learning algorithm on third data indicative of previous interactions of the first user with the one or more third-party reward programs, the machine learning algorithm being configured to determine propensities of the first user to accumulate or redeem the one or more rewards;
determining that the one or more rewards are redeemable for the listing based at least in part on the match, the one or more rewards including:
a first reward associated with the accommodation from a first merchant;
a second reward associated with at least one attraction of the one or more attractions from a second merchant; or
a third reward associated with the transportation to and from the travel destination from a third merchant;
generating, for the first user, a personalized search result corresponding to the listing based at least in part on the propensities of the first user identified from execution of the machine learning algorithm by at least one of:
annotating a presentation of the search result to indicate that at least one of the first reward, the second reward, or the third reward are redeemable for the listing, or
adjusting at least one of a first cost associated with the accommodation, a second cost associated with the one or more attractions, or a third cost associated with the transportation to and from the travel destination to reflect a redemption of the first reward, the second reward, or the third reward;
generating a personalized search engine results page according to the propensities of the first user identified from execution of the machine learning algorithm, the personalized search engine results page including the personalized search result;
providing for display as part of the user interface, the personalized search result;
providing for display as part of the user interface, reward program data from the one or more third-party merchant reward programs;
determining that the first user selected the personalized search result; and
based at least in part on the first user selecting the personalized search result, redeeming at least one of the first reward, the second reward, or the third reward from at least one of the first merchant, the second merchant, or the third merchant.

5. The computer-implemented method of claim 4, wherein:
the first data indicates first terms for redeeming the one or more rewards; and
the second data indicates at least one of information about the itinerary and second terms for acquiring a portion of the itinerary.

6. The computer-implemented method of claim 5, further comprising:
generating the personalized search result based at least in part on an indication that the one or more rewards are redeemable for the listing; and
providing for display as part of the user interface associated with the service, the personalized search result.

7. The computer-implemented method of claim 6, further comprising:
accessing fourth data corresponding to user actions associated with at least one of a retail purchase account associated with the first user or third-party merchant sources and systems;
determining the propensities of the first user based at least in part on the third data and the fourth data; and
determining a ranking order for the one or more rewards based at least in part on the propensities of the first user.

8. The computer-implemented method of claim 7, further comprising providing for display as part of the user interface associated with the service, generating the personalized search result based at least in part on the ranking order.

9. The computer-implemented method of claim 4, further comprising:
generating the personalized search result by annotating a presentation of the search result to describe the one or more rewards redeemable for the listing; and
providing for display, as part of the user interface associated with the service, the personalized search result.

10. The computer-implemented method of claim 4, further comprising:
generating the personalized search result by replacing one of the first cost, the second cost, or the third cost with a modified cost reflecting a redemption of the reward that is redeemable for the listing; and
providing for display, as part of the user interface associated with the service, the personalized search result.

11. The computer-implemented method of claim 4, further comprising:
generating the personalized search result by annotating a presentation of the search result to include a recommendation for a new third-party merchant reward program that is associated with an additional reward that is available from the new reward program; and providing for display as part of the user interface associated with the service, the personalized search result.

12. The computer-implemented method of claim 4, wherein generating the personalized search engine results page comprises:
providing for display as part of the user interface associated with the service, the personalized search engine results page;
determining a value score for the search result, the value score comparing a first value of one of the one or more rewards the redeemable for the listing and a second value of a corresponding cost in cash for the one of the one or more rewards based at least in part on propensities of the first user; and
ranking search results of the plurality of search results based at least in part on the value score.

13. The computer-implemented method of claim 4, further comprising mapping, in a database, the reward program data to a user profile corresponding to the first user.

14. A system comprising:
one or more processors; and
a memory that stores one or more modules that are executable by the one or more processors to cause the system to perform operations comprising:
receiving a search query from a computing device, the search query being associated with a travel destination and a user;
accessing a plurality of search results associated with the search query corresponding to a listing for an itinerary, the itinerary including an accommodation at the travel destination, one or more attractions associated with the travel destination, and transportation to and from the travel destination;
accessing third-party merchant reward program data associated with the user that includes first data corresponding to third-party merchant rewards available from a plurality of reward programs;
determining that one or more rewards of the third-party merchant rewards are redeemable for a listing corresponding to a search result of the plurality of search results, the one or more rewards including:
a first reward associated with the accommodation from a first merchant;
a second reward associated with at least one attraction of the one or more attractions from a second merchant; or
a third reward associated with the transportation to and from the travel destination from a third merchant;
executing a machine learning algorithm on second data corresponding to previous interactions of the user with the plurality of reward programs, the machine learning algorithm being configured to identify from the second data propensities of the user to accumulate or redeem the third-party merchant rewards;
generating a personalized search result from the search result based at least in part on a determination that the one or more rewards are redeemable for the listing and on the propensities of the user identified from execution of the machine learning algorithm by at least one of:
annotating a presentation of the search result to indicate that at least one of the first reward, the second reward, or the third reward are redeemable for the listing, or
adjusting at least one of a first cost associated with the accommodation, a second cost associated with the one or more attractions, or a third cost associated with the transportation to and from the travel destination to reflect a redemption of the first reward, the second reward, or the third reward;
generating a user interface to present the personalized search result;
providing the user interface to be displayed; and
determining an interaction between the user and the user interface, the interaction indicating a selection from the personalized search result.

15. The system of claim 14, the operations further comprising:
accessing third data corresponding to user actions associated with at least one of a retail purchase account associated with the user or third-party merchant sources and systems; and
identifying the propensities of the user based at least in part on the second data and the third data.

16. The system of claim 15, wherein generating the user interface further comprises modifying the plurality of search results based at least in part on the propensities of the user identified from execution of the machine learning algorithm to promote selection from the personalized search result.

17. The system of claim 14, the operations further comprising determining that the one or more rewards are redeemable for the search result based at least in part on:
reward data associated with the one or more rewards;
a comparison of the reward data to listing data corresponding to the listing; and
a match between at least a portion of the reward data and at least a portion of the listing data.

18. The system of claim 17, the operations further comprising generating the personalized search result by at least one of:
annotating the search result with information indicating that the one or more rewards are redeemable for the listing; or
replacing a cost presented in association with the listing with new cost information reflecting a redemption of the one or more rewards.

19. The system of claim 17, the operations further comprising:
weighting search results based at least in part on the propensities of the user identified from execution of the machine learning algorithm and a value score associated with the listing.

20. The system of claim 14, wherein accessing the third-party merchant reward program data associated with the user further comprises:
receiving one or more unique identifiers for accessing at least one third-party merchant reward program; and
accessing the at least one third-party merchant reward program to obtain the third-party merchant reward program data associated with the user.

* * * * *